United States Patent
Cheema et al.

(10) Patent No.: US 11,888,571 B2
(45) Date of Patent: Jan. 30, 2024

(54) CONFIGURING INFORMATION FOR LOCATION DETERMINATION

(71) Applicant: Lenovo (Singapore) Pte. Ltd., New Tech Park (SG)

(72) Inventors: Sher Ali Cheema, Ilmenau (DE); Robin Thomas, Frankfurt am Main (DE); Majid Ghanbarinejad, Chicago, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/561,449

(22) Filed: Dec. 23, 2021

(65) Prior Publication Data
US 2023/0208495 A1    Jun. 29, 2023

(51) Int. Cl.
- *H04B 7/06* (2006.01)
- *H04B 17/373* (2015.01)
- *H04B 17/327* (2015.01)

(52) U.S. Cl.
CPC ......... *H04B 7/0695* (2013.01); *H04B 17/327* (2015.01); *H04B 17/373* (2015.01)

(58) Field of Classification Search
CPC ... H04B 7/0626; H04B 7/0632; H04L 5/0032; H04W 64/00; G01S 5/0018; G01S 5/02; G01S 5/0221; G01S 5/0226
See application file for complete search history.

(56) References Cited

U.S. PATENT DOCUMENTS

| | | | |
|---|---|---|---|
| 2013/0197860 A1 | 8/2013 | Gutt et al. | |
| 2021/0144539 A1 | 5/2021 | Edge et al. | |
| 2022/0167342 A1* | 5/2022 | Raghavan | H04W 72/044 |
| 2022/0271818 A1* | 8/2022 | Svendsen | H04B 7/0897 |
| 2022/0368488 A1* | 11/2022 | Berggren | H04L 5/0032 |

FOREIGN PATENT DOCUMENTS

WO    2020160775 A1    8/2020

OTHER PUBLICATIONS

3GPP, "3rd Generation Partnership Project; Technical Specification Group Core Network and Terminals; Non-Access-Stratum (NAS) functions related to Mobile Station (MS) in idle mode (Release 17)", 3GPP TS 23.122 V17.4.0, Sep. 2021, pp. 1-107.

(Continued)

*Primary Examiner* — David S Huang
(74) *Attorney, Agent, or Firm* — Kunzler Bean & Adamson

(57) ABSTRACT

Apparatuses, methods, and systems are disclosed for configuring information for location determination. One method includes transmitting, from a location server, a request including an indication to provide beam configuration information and associated received signal strength measurements of a target user equipment. The method includes receiving a response message including the beam configuration information and associated received signal strength measurements. The method includes determining the location of the target UE based on a mapping between the beam configuration information and the associated received signal strength measurements.

20 Claims, 18 Drawing Sheets

(56) References Cited

OTHER PUBLICATIONS

3GPP, "3rd Generation Partnership Project; Technical Specification Group Services and System Aspects; 5G System (5GS) Location Services (LCS); Stage 2 (Release 16)", 3GPP TS 23.273 V16.9.0, Dec. 2021, pp. 1-98.

3GPP, "3rd Generation Partnership Project; Technical Specification Group Services and System Aspects; System architecture for the 5G System (5GS); Stage 2 (Release 16)", 3GPP TS 23.501 V16.11.0, Dec. 2021, pp. 1-453.

3GPP, "3rd Generation Partnership Project; Technical Specification Group Services and System Aspects; Procedures for the 5G System (5GS); Stage 2 (Release 16)", 3GPP TS 23.502 V16.11.0, Dec. 2021, pp. 1-614.

3GPP, "3rd Generation Partnership Project; Technical Specification Group Radio Access Network; Evolved Universal Terrestrial Radio Access (E-UTRA); Physical channels and modulation (Release 16)", 3GPP TS 36.211 V16.7.0, Sep. 2021, pp. 1-249.

3GPP, "3rd Generation Partnership Project; Technical Specification Group Radio Access Network; LTE Positioning Protocol (LPP) (Release 16)", 3GPP TS 37.355 V16.7.0, Dec. 2021, pp. 1-299.

3GPP, "3rd Generation Partnership Project; Technical Specification Group Radio Access Network; NR; Physical layer measurements (Release 16)", 3GPP TS 38.215 V16.4.0, Dec. 2020, pp. 1-25.

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.7.0, Dec. 2021, pp. 1-121.

3GPP, "3rd Generation Partnership Project; Technical Specification Group Radio Access Network; NG-RAN; Architecture description (Release 16)", 3GPP TS 38.401 V16.8.0, Dec. 2021, pp. 1-79.

3GPP, "3rd Generation Partnership Project; Technical Specification Group Radio Access Network; NG-RAN; NR Positioning Protocol A (NRPPa) (Release 16)", 3GPP TS 38.455 V16.6.0, Dec. 2021, pp. 1-154.

3GPP, "3rd Generation Partnership Project; Technical Specification Group Radio Access Network; Solutions for NR to support non-terrestrial networks (NTN) (Release 16)", 3GPP TR 38.821 V16.1.0, May 2021, pp. 1-140.

3GPP, "3rd Generation Partnership Project; Technical Specification Group Radio Access Network; Study on NR positioning support (Release 16)", 3GPP TR 38.855 V16.0.0, Mar. 2019, pp. 1-197.

3GPP, "3rd Generation Partnership Project; Technical Specification Group Radio Access Network; Study on NR Positioning Enhancements; (Release 17)", 3GPP TR 38.857 V17.0.0, Mar. 2021, pp. 1-545.

Qualcomm Inc, "[Pre115-e][102][NTN] Summary of AI 8.10.3.1—LCS aspects only", 3GPP TSG-RAN WG2 Meeting #115-e R2-2108848, Aug. 9-27, 2021, pp. 1-5.

Qualcomm Inc, "[offline 102] LCS aspects", 3GPP TSG-RAN WG2 Meeting #115-e R2-2108884, Aug. 9-27, 2021, pp. 1-22.

Qualcomm Inc, "[offline 102] LCS aspects—second round", 3GPP TSG-RAN WG2 Meeting #115-e R2-2108898, Aug. 9-27, 2021, pp. 1-13.

PCT/IB2022/062749, "Notification of Transmittal of the International Search Report and the Written Opinion of the International Searching Authority, or the Declaration", International Searching Authority, dated Apr. 11, 2023, pp. 1-13.

\* cited by examiner

400

500

700

```
NG-RANAccessPointPosition ::= SEQUENCE {
    latitudeSign                    ENUMERATED (north, south),
    latitude                        INTEGER (0..8388607),
    longitude                               INTEGER (-8388608..8388607),
    directionOfAltitude             ENUMERATED (height, depth),
    altitude                        INTEGER (0..32767),
    uncertaintySemi-major   INTEGER (0..127),
    uncertaintySemi-minor   INTEGER (0..127),
    orientationOfMajorAxis  INTEGER (0..179),
    uncertaintyAltitude             INTEGER (0..127),
    confidence                              INTEGER (0..100),
    iE-Extensions                   ProtocolExtensionContainer { { NG-
RANAccessPointPosition-ExtIEs} } OPTIONAL,
        ...
}
```

```
E-CID-MeasurementResult ::= SEQUENCE {
        servingCell-ID                              NG-RAN-CGI,
        servingCellTAC                              TAC,
        nG-RANAccessPointPosition       NG-RANAccessPointPosition OPTIONAL,
        measuredResults                             MeasuredResults
            OPTIONAL,
        iE-Extensions                               ProtocolExtensionContainer
{ { E-CID-MeasurementResult-ExtIEs} } OPTIONAL,
        ...
}
```

FIG. 8

```
E-CID-MeasurementResult-ExtIEs NRPPA-PROTOCOL-EXTENSION ::= {
      { ID id-GeographicalCoordinates   CRITICALITY ignore      EXTENSION
GeographicalCoordinates PRESENCE optional},
      ...
}

GeographicalCoordinates ::= SEQUENCE {
      tRPPositionDefinitionType TRPPositionDefinitionType,
      dLPRSResourceCoordinates  DLPRSResourceCoordinates OPTIONAL,
      iE-Extensions                                 ProtocolExtensionContainer
{ { GeographicalCoordinates-ExtIEs } } OPTIONAL,
      ...
}

TRPPositionDefinitionType ::= CHOICE {
      direct            TRPPositionDirect,
      referenced        TRPPositionReferenced,
      choice-extension                                              ProtocolIE-
Single-Container { { TRPPositionDefinitionType-ExtIEs } }
}

TRPPositionDirect ::= SEQUENCE {
      accuracy TRPPositionDirectAccuracy,
      iE-extensions            ProtocolExtensionContainer { { TRPPositionDirect-
ExtIEs } }       OPTIONAL,
      ...
}

TRPPositionDirectAccuracy ::= CHOICE {
      tRPPosition                      NG-RANAccessPointPosition tRPHAposition            NGRANHighAccuracyAccessPointPosition      ,
      choice-extension                 ProtocolIE-Single-Container
{ { TRPPositionDirectAccuracy-ExtIEs } }
}

TRPPositionReferenced ::= SEQUENCE {
      referencePoint                                  ReferencePoint,
      referencePointType                              TRPReferencePointType,
      iE-extensions
      ProtocolExtensionContainer { { TRPPositionReferenced-ExtIEs } }    OPTIONAL,
      ...
}

TRPReferencePointType ::= CHOICE {
      tRPPositionRelativeGeodetic                     RelativeGeodeticLocation,
      tRPPositionRelativeCartesian            RelativeCartesianLocation,
      choice-extension                                              ProtocolIE-
Single-Container { { TRPReferencePointType-ExtIEs } }
}
```

FIG. 9

CONFIGURING INFORMATION FOR LOCATION DETERMINATION

FIELD

The subject matter disclosed herein relates generally to wireless communications and more particularly relates to configuring information for location determination.

BACKGROUND

In certain wireless communications networks, a determined location of a user equipment may not be accurate. In such networks, communication errors may occur.

BRIEF SUMMARY

Methods for configuring information for location determination are disclosed. Apparatuses and systems also perform the functions of the methods. One embodiment of a method includes receiving, at a non-terrestrial station, a request message including an indication to provide beam configuration information associated with a cell serving a user equipment. In some embodiments, the method includes obtaining the beam configuration information associated with the cell. In certain embodiments, the method includes transmitting a response message including the beam configuration information.

One apparatus for configuring information for location determination includes a non-terrestrial station. In some embodiments, the apparatus includes a receiver that receives a request message including an indication to provide beam configuration information associated with a cell serving a user equipment. In various embodiments, the apparatus includes a processor that obtains the beam configuration information associated with the cell. In certain embodiments, the apparatus includes a transmitter that transmits a response message including the beam configuration information.

Another embodiment of a method for configuring information for location determination includes receiving, at a user equipment, a request message from a location server. The request message includes an indication indicating a plurality of parameters, and the plurality of the parameters includes a reference signal received power (RSRP), a reference signal received quality (RSRQ), a beam identifier, a reference signal index, or some combination thereof. In some embodiments, the method includes performing an RSRP measurement, an RSRQ measurement, or a combination thereof on a reference signal. The reference signal is associated with the beam identifier, the reference signal index, or a combination thereof. In certain embodiments, the method includes transmitting a response message to the location server. The response message includes a result of the RSRP measurement, the RSRQ measurement, or the combination thereof.

Another apparatus for configuring information for location determination includes a user equipment. In some embodiments, the apparatus includes a receiver that receives a request message from a location server. The request message includes an indication indicating a plurality of parameters, and the plurality of the parameters includes a reference signal received power (RSRP), a reference signal received quality (RSRQ), a beam identifier, a reference signal index, or some combination thereof. In various embodiments, the apparatus includes a processor that performs an RSRP measurement, an RSRQ measurement, or a combination thereof on a reference signal. The reference signal is associated with the beam identifier, the reference signal index, or a combination thereof. In certain embodiments, the apparatus includes a transmitter that transmits a response message to the location server. The response message includes a result of the RSRP measurement, the RSRQ measurement, or the combination thereof.

A further embodiment of a method for configuring information for location determination includes receiving, at a user equipment, a request message from a location server. The request message includes an indication indicating whether to report a measurement associated with a serving beam or a neighboring beam. In some embodiments, the method includes performing an RSRP measurement, an RSRQ measurement, or a combination thereof on a reference signal. The reference signal is determined based on the indication. In certain embodiments, the method includes transmitting a response message to the location server. The response message includes a result of the RSRP measurement, the RSRQ measurement, or the combination thereof.

A further apparatus for configuring information for location determination includes a user equipment. In some embodiments, the apparatus includes a receiver that receives a request message from a location server. The request message includes an indication indicating whether to report a measurement associated with a serving beam or a neighboring beam. In various embodiments, the apparatus includes a processor that performs an RSRP measurement, an RSRQ measurement, or a combination thereof on a reference signal. The reference signal is determined based on the indication. In certain embodiments, the apparatus includes a transmitter that transmits a response message to the location server. The response message includes a result of the RSRP measurement, the RSRQ measurement, or the combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a diagram illustrating one embodiment of a NG-RAN access point position IE;

FIG. 8 is a diagram illustrating one embodiment of an E-CID measurement result IE;

FIG. 9 is a diagram illustrating another embodiment of an E-CID measurement result IE;

DETAILED DESCRIPTION

Figure 1:
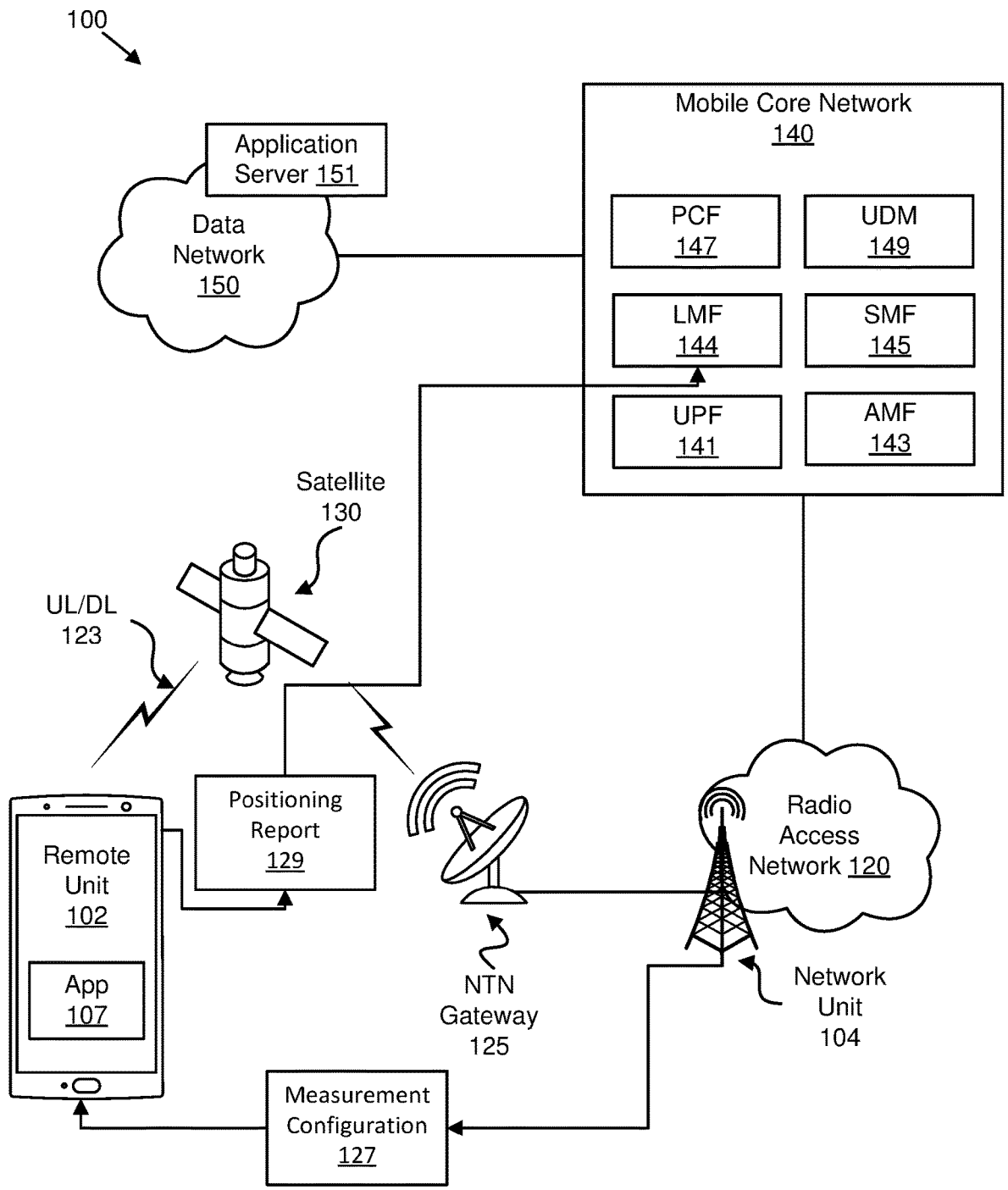
FIG. 1 is a schematic block diagram illustrating one embodiment of a wireless communication system for configuring information for location determination.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring information for location determination. In one embodiment, the wireless communication system 100 includes at least one remote unit 102, a radio access network ("RAN") 120, and a mobile core network 140. The RAN 120 and the mobile core network 140 form a mobile communication network. The RAN 120 may be composed of a network unit 104 with which the remote unit 102 communicates via a satellite 130 using wireless communication links 123. As depicted, the mobile communication network includes an "on-ground" network unit 104 which serves the remote unit 102 via satellite access.

Even though a specific number of remote units 102, network units 104, wireless communication links 123, RANs 120, satellites 130, non-terrestrial network gateways 125 (e.g., satellite ground/earth devices), and mobile core networks 140 are depicted in FIG. 1, one of skill in the art will recognize that any number of remote units 102, network units 104, wireless communication links 123, RANs 120, satellites 130, non-terrestrial network gateways 125, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 102 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 102 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 102 may include a terminal equipment ("TE") and/or be embedded in an appliance or device (e.g., a computing device, as described above).

The remote units 102 may communicate directly with one or more of the network units 104 in the RAN 120 via uplink ("UL") and downlink ("DL") communication signals. In some embodiments, the remote units 102 communicate in a non-terrestrial network via UL and DL communication signals between the remote unit 102 and a satellite 130. In certain embodiments, the satellite 130 may communicate with the RAN 120 via an NTN gateway 125 using UL and DL communication signals between the satellite 130 and the NTN gateway 125. The NTN gateway 125 may communicate directly with the network units 104 in the RAN 120 via UL and DL communication signals. Furthermore, the UL and DL communication signals may be carried over the wireless communication links 123. Here, the RAN 120 is an intermediate network that provides the remote units 102 with access to the mobile core network 140. Moreover, the satellite 130 provides a non-terrestrial network allowing the remote unit 102 to access the mobile core network 140 via satellite access. While FIG. 1 depicts a transparent NTN system where the satellite 130 repeats the waveform signal for the network unit 104, in other embodiments the satellite 130 (for regenerative NTN system), or the NTN gateway 125 (for alternative implementation of transparent NTN system) may also act as base station, depending on the deployed configuration.

In some embodiments, the remote units 102 communicate with an application server 151 via a network connection with the mobile core network 140. For example, an application 107 (e.g., web browser, media client, telephone and/or Voice-over-Internet-Protocol ("VoIP") application) in a remote unit 102 may trigger the remote unit 102 to establish a protocol data unit ("PDU") session (or other data connection) with the mobile core network 140 via the RAN 120. The mobile core network 140 then relays traffic between the remote unit 102 and the application server 151 in the packet data network 150 using the PDU session. The PDU session represents a logical connection between the remote unit 102 and the User Plane Function ("UPF") 141.

In order to establish the PDU session (or PDN connection), the remote unit 102 must be registered with the mobile core network 140 (also referred to as "attached to the mobile core network" in the context of a Fourth Generation ("4G") system). Note that the remote unit 102 may establish one or more PDU sessions (or other data connections) with the mobile core network 140. As such, the remote unit 102 may have at least one PDU session for communicating with the packet data network 150. The remote unit 102 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 102 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 102 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The network units 104 may be distributed over a geographic region. In certain embodiments, a network unit 104 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The network units 104 are generally part of a RAN, such as the RAN 120, that may include one or more controllers communicably coupled to one or more corresponding network units 104. These and other elements of radio access network are not illustrated but are well known generally by those having ordinary skill in the art. The network units 104 connect to the mobile core network 140 via the RAN 120. Note that in the NTN scenario certain RAN entities or functions may be incorporated into the satellite 130. For example, the satellite 130 may be an embodiment of a Non-Terrestrial base station/base unit.

The network units 104 may serve a number of remote units 102 within a serving area, for example, a cell or a cell sector, via a wireless communication link 123. The network units 104 may communicate directly with one or more of the remote units 102 via communication signals. Generally, the network units 104 transmit DL communication signals to serve the remote units 102 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 102 and/or one or more of the network units 104. Note that during NR operation on unlicensed spectrum (referred to as "NR-U"), the network unit 104 and the remote unit 102 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 102 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Location Management Function ("LMF") 144, a Session Management Function ("SMF") 145, a Policy Control Function ("PCF") 147, a Unified Data Management function ("UDM") and a User Data Repository ("UDR", also referred to as "Unified Data Repository"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The LMF 144 receives positioning measurements or estimates (e.g., positioning report 129) from RAN 120 and the remote unit 102 (e.g., via the AMF 143) and computes the position of the remote unit 102 (e.g., based on a measurement configuration 127). The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the Fifth Generation Core network ("5GC"). When present, the AUSF may act as an authentication server and/or authentication proxy, thereby allowing the AMF 143 to authenticate a remote unit 102. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 102 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for dynamically adapting a measurement behavior apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MIME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station/base unit, but it is replaceable by any other radio access node, e.g., gNB, ng-eNB, eNB, Base Station ("BS"), Access Point ("AP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for dynamically adapting a measurement behavior.

In some embodiments, a remote unit 102 may receive, at a user equipment, a request message from a location server. The request message includes an indication indicating a plurality of parameters, and the plurality of the parameters includes a reference signal received power (RSRP), a reference signal received quality (RSRQ), a beam identifier, a reference signal index, or some combination thereof. In some embodiments, the remote unit 102 may perform an RSRP measurement, an RSRQ measurement, or a combination thereof on a reference signal. The reference signal is associated with the beam identifier, the reference signal index, or a combination thereof. In certain embodiments, the remote unit 102 may transmit a response message to the location server. The response message includes a result of the RSRP measurement, the RSRQ measurement, or the combination thereof. Accordingly, the remote unit 102 may be used for configuring information for location determination.

In various embodiments, a remote unit 102 may receive, at a user equipment, a request message from a location server. The request message includes an indication indicating whether to report a measurement associated with a serving beam or a neighboring beam. In some embodiments, the remote unit 102 may perform an RSRP measurement, an RSRQ measurement, or a combination thereof on a reference signal. The reference signal is determined based on the indication. In certain embodiments, the remote unit 102 may transmit a response message to the location server. The response message includes a result of the RSRP measurement, the RSRQ measurement, or the combination thereof. Accordingly, the remote unit 102 may be used for configuring information for location determination.

In certain embodiments, a network unit 104 and/or mobile core network 140 may receive, at a non-terrestrial station, a request message including an indication to provide beam configuration information associated with a cell serving a user equipment. In some embodiments, the network unit 104 and/or the mobile core network 140 may obtain the beam configuration information associated with the cell. In certain embodiments, the network unit 104 and/or the mobile core network 140 may transmit a response message including the beam configuration information. Accordingly, the network unit 104 and/or the mobile core network 140 may be used for configuring information for location determination.

Figure 2:
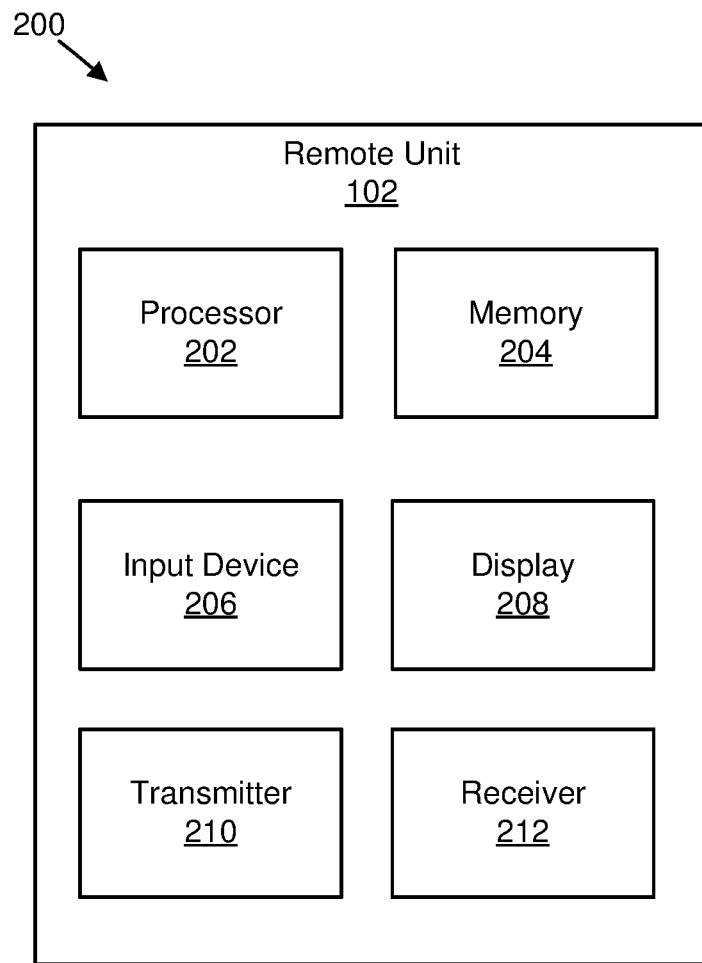
FIG. 2 is a schematic block diagram illustrating one embodiment of an apparatus that may be used for configuring information for location determination.

FIG. 2 depicts one embodiment of an apparatus 200 that may be used for configuring information for location determination. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the receiver 212 receives a request message from a location server. The request message includes an indication indicating a plurality of parameters, and the plurality of the parameters includes a reference signal received power (RSRP), a reference signal received quality (RSRQ), a beam identifier, a reference signal index, or some combination thereof. In various embodiments, the processor 202 performs an RSRP measurement, an RSRQ measurement, or a combination thereof on a reference signal. The reference signal is associated with the beam identifier, the reference signal index, or a combination thereof. In certain embodiments, the transmitter 210 transmits a response message to the location server. The response message includes a result of the RSRP measurement, the RSRQ measurement, or the combination thereof.

In some embodiments, the receiver 212 receives a request message from a location server. The request message includes an indication indicating whether to report a measurement associated with a serving beam or a neighboring beam. In various embodiments, the processor 202 performs an RSRP measurement, an RSRQ measurement, or a combination thereof on a reference signal. The reference signal is determined based on the indication. In certain embodiments, the transmitter 210 transmits a response message to the location server. The response message includes a result of the RSRP measurement, the RSRQ measurement, or the combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
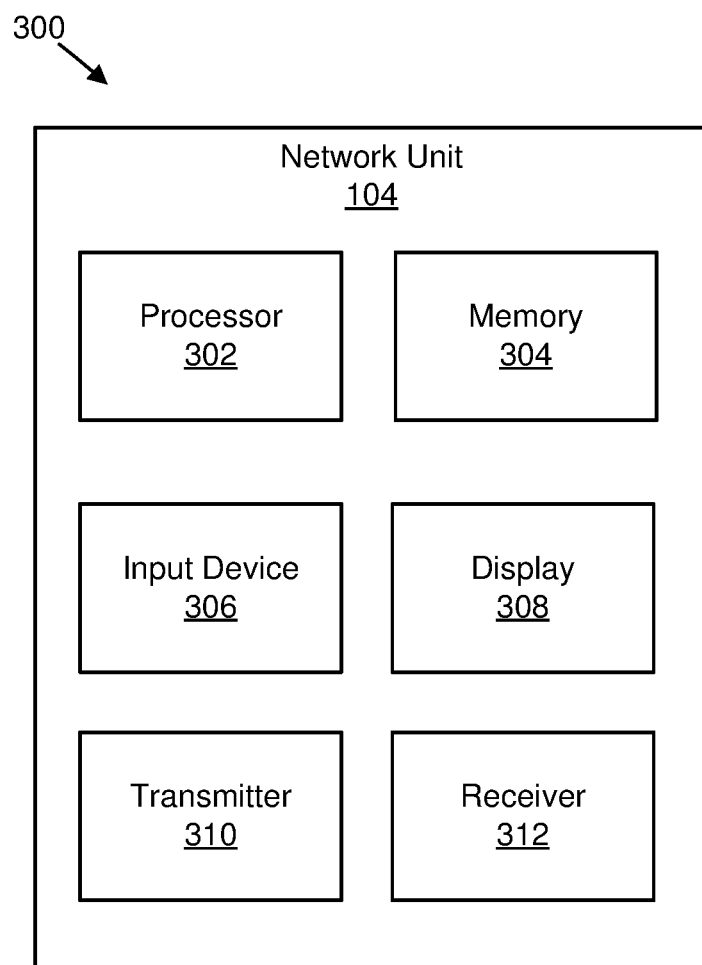
FIG. 3 is a schematic block diagram illustrating one embodiment of an apparatus that may be used for configuring information for location determination.

FIG. 3 depicts one embodiment of an apparatus 300 that may be used for configuring information for location determination. The apparatus 300 includes one embodiment of the network unit 104 and/or one or more functions of the mobile core network 140. Furthermore, the network unit 104 and/or one or more functions of the mobile core network 140 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives a request message including an indication to provide beam configuration information associated with a cell serving a user equipment. In various embodiments, the processor 302 obtains the beam configuration information associated with the cell. In certain embodiments, the transmitter 310 transmits a response message including the beam configuration information.

In certain embodiments, configuration, measurement, processing, and reporting radio access technology ("RAT") dependent positioning methods may be enabled for target user equipments ("UEs") connected to a non-terrestrial based network. Depending on the configured positioning method, certain configuration signaling parameters from a location management function ("LMF") may need to be adapted such that the target-UE can report desired and/or accurate positioning measurements in a low latency manner. Specifically, in non-terrestrial networks ("NTNs"), a number of satellites that provide coverage to a UE may be limited. This may demand positioning methodologies such as enhanced cell identifiers ("IDs") ("E-CIDs") that function with only one satellite. Moreover, regulatory and emergency requirements in NTN may not demand stringent accurate positioning. However, a cell size in NTN may be very large (e.g., in the order of hundreds of kilometers), may depend on a satellite orbital constellation (e.g., low earth orbit ("LEO"), medium earth orbit ("MEO"), geostationary earth orbit ("GEO")), and a number of beams in a cell. This may result in very large positioning accuracy and may not fulfil regulatory requirements. Moreover, in contrast to terrestrial networks (e.g., where gNBs are stationary), the movement of LEO satellites results in frequent mobility events that may result in an inaccurate location if this information is not used in an efficient manner.

In some embodiments, a set of signaling and procedural enhancements may enable support of enhanced cell ID positioning methods over an NTN supported network. Moreover, various embodiments may increase an accuracy for E-CID methods.

In certain embodiments, a UE position may be estimated in an NTN where fine absolute accuracy is not necessity (e.g., emergency and regulatory configurations). For instance, to ensure that regulatory requirements are met, a network may be configured to enforce that a selected public land mobile network ("PLMN") is enabled to operate in a country of the UE location by verifying the UE location during mobility management and session management procedures. Depending on a cell layout and a number of beams in a cell in non-terrestrial systems, one beam in a cell may cover an entire country or a specific region of interest. If a beam level accuracy may be verified, this may satisfy a regulatory requirement to verify a UE location in a country. In such configurations, a coarse UE location may be estimated by performing measurements on radio signals at a cell level (e.g., using cell ID) for configurations where one or more beams may be associated within a cell or finer location at a beam level (e.g., using beam ID). Specifically, for configurations where there are multiple beams in a cell, an E-CID methodology may not provide beam level accuracy and may be more specific for terrestrial networks. For example, as compared to terrestrial networks, beams in NTN may be generally mapped to certain geographical coordinates. Hence, to achieve beam level accuracy and/or to use existing E-CID methodology for NTN systems, additional information and/or signaling may be required to exchange between a next generation ("NG") radio access network ("RAN") ("NG-RAN") node and a location management function ("LMF"). The accuracy of such a methodology may be increased in multiple ways. Some methods for accuracy enhancements may include: 1) accuracy enhancement using signal strength and elevation angle mapping; 2) accuracy enhancement using measurement on multiple beams; and/or 3) accuracy enhancement using satellite movement information. It should be noted that: 1) embodiments herein may be implemented in combination with each other to support NR beam-based and/or cell-based positioning using supported NTN interfaces and network entities and/or nodes; 2) a positioning-related reference signal may be referred to as a reference signal used for positioning procedures and/or purposes to estimate a target-UE's location (e.g., positioning reference signal ("PRS") or based on existing reference signals such as channel state information ("CSI") reference signal ("RS") ("CSI-RS") or sounding reference signal ("SRS")—a target UE may be referred to as a device and/or entity to be localized and/or positioned—in various embodiments, the term PRS may refer to any signal such as a reference signal that may or may not be used primarily for positioning; and/or 3) a target UE may be referred to as a UE of interest whose position is to be obtained by a network or by the UE itself.

In a first embodiment, there may be enhanced beam ID based positioning in NTN.

In some embodiments, such as in NTN, a beam footprint size and/or diameter may be large as compared to terrestrial networks ("TNs") and it may vary based on an altitude of a satellite. Even for LEO satellites, the beam footprint size may be in the order of hundreds of kilometers. Consequently, a cell size may also be very large. Specifically, the cell size depends on a number of beams in the cell. In such configurations, where multiple beams are deployed in a cell for a LEO constellation, an enhanced cell ID based positioning method may result in positioning accuracy of hundreds of kilometers as it is linked to the cell size (e.g., a location server is only aware that a device is mapped to which gNB (e.g., satellite), which may be based on an NTN with a transparent payload or a regenerative payload architecture). Moreover, in an NTN, a satellite beam is generated by an antenna onboard the satellite for a certain coverage area on the ground, whereas these beams and/or cells either may be moving with respect to the ground by following the satellite coverage or may be fixed to a certain location on earth from the time where the satellite is at a certain elevation angle over the horizon until the same satellite has reached the same elevation angle at the opposite horizon. The former may be called an earth-moving beam and/or cell whereas the latter may be called an earth-fixed beam and/or cell.

In various embodiments, compared to a terrestrial network where gNBs are fixed, a knowledge of satellite movement and mapping of beams and/or cells to a certain location on earth (e.g., to a known geographical coordinates) may be used to calculate a location of a target UE on the ground. In general, spot beams may be employed in satellite systems that target the radio signals from a satellite at a specific point on the earth's surface (e.g., desired set of latitude and longitude at earth). Using known variables, such as satellite latitude and longitude, satellite altitude, and earth coverage coordinates (e.g., latitude and/or longitude, cartesian, or Euler), a translation of a space-based beam map to a ground-based beam map is performed by employing coordinates conversion methodologies (e.g., satellite coordinate system and antenna coordinate system transformation to an Earth-Centered, Earth-Fixed ("ECEF") coordinate system, use of rotation matrix, and so forth.

In certain embodiments, a positioning fix of a target-UE may be based on a beam ID instead of a cell ID since a serving beam is mapped to known earth geographical coordinates. In such embodiments, positioning methodology may be named as enhanced beam ID ("E-BID") based positioning. The accuracy of positioning may be linked to a beam footprint size. It may be noted that for one beam per cell in NTN, the E-BID may correspond to E-CID since the beam footprint size corresponds to a cell and positioning accuracy and may be the same as a cell size.

In some embodiments, a location management function ("LMF") may use request and response signaling (e.g., via NR positioning protocol annex ("NRPPa") or any direct and/or indirect interface between the NTN gNB and location server PositioningInformation message to query the NTN beam IDs associated with the UE and/or group of UEs). In addition to predetermined information for a E-CID method, a gNB may also share associated information related to provided beams including: 1) synchronization signal block ("SSB") IDs; 2) number of beams in a cell; 3) beam coverage area coordinates (e.g., a set of latitude and longitude corresponding to beam IDs); 4) beam footprint size; 5) satellite altitude and speed; 6) satellite coordinates (e.g., latitude and longitude); 7) time duration associated with a coverage of a specific beam; 8) beam of a serving NTN gNB may be partially and/or fully overlapping with another beam from another NTN gNB beam; and/or 9) earth fixed beams and/or cells or earth moving cells.

In various embodiments, an ID associated with a cell, such as an ID associated with a synchronization signal and physical broadcast channel ("SS/PBCH") block, also known as a synchronization signal block ("SSB"), may be communicated from an NTN to a location server (e.g., LMF). It should be noted that, as used herein, the generic term NTN may refer to an entity in a network that may be capable of supporting non-terrestrial access to a target UE.

In certain embodiments, an ID associated with another reference signal, such as a CSI-RS, may be sent to a LMF by the NTN.

In some embodiments, a cell may be provided through one or may beams by a non-terrestrial network node, referred to as a non-terrestrial transmit-receive point ("NT-TRP") herein. If a cell is provided through multiple beams, a number of beams may be sent to a location server. The location server may then obtain map beams to locations according to a predetermined or preconfigured geometry or configuration (e.g., as a function of cell parameters such as a cell center location on the ground, a cell radius, and so forth).

In various embodiments, a configuration or geometry of beams in a cell may be sent to a location server. For example, if a cell is provided through 3 or 7 beams as shown in the FIGS. 4 and 5, coordinates of each beam may be indicated to the location server.

Figure 4:
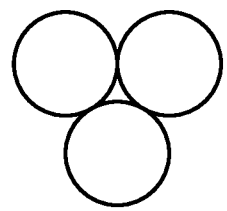
FIG. 4 is a schematic block diagram illustrating one embodiment of a system having an NTN cell layout with 3 beams.
Figure 5:
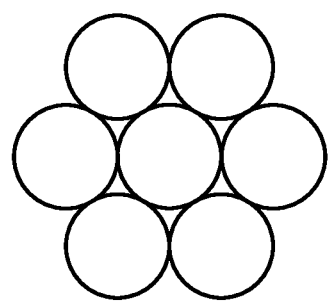
FIG. 5 is a schematic block diagram illustrating one embodiment of a system having an NTN cell layout with 7 beams.

FIG. 4 is a schematic block diagram illustrating one embodiment of a system 400 having an NTN cell layout with 3 beams. Further, FIG. 5 is a schematic block diagram illustrating one embodiment of a system 500 having an NTN cell layout with 7 beams.

In certain embodiments, a beam may be associated with a cell portion via a cell portion ID. In some embodiments, a portion of a beam may be associated with a cell portion ID. For example, a sector in a beam footprint (e.g., with a circular or noncircular shape) may be associated with cell portion ID.

In various embodiments, a beam footprint size may be communicated from an NTN to an LMF. In certain embodiments, information about a footprint size may include a value of a radius or diameter associated with a beam and/or cell. This information may be sufficient in some realizations if the beam footprint shape is circle or very similar to a circle.

However, in some realizations, a beam footprint shape may not be a circle. For example, for a LEO and/or MEO satellite with a distance closer to the ground compared to a GEO satellite, a beam and/or cell shape may be elliptical, as shown in FIG. 6.

Figure 6:
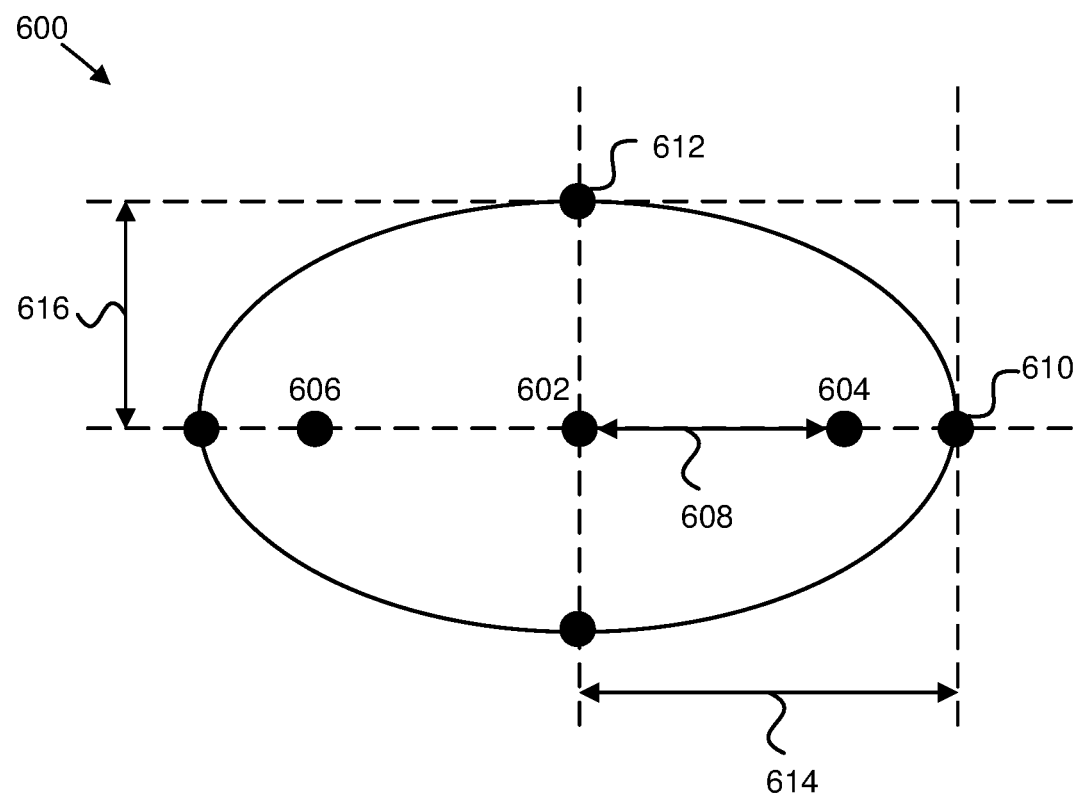
FIG. 6 is a schematic block diagram illustrating one embodiment of an elliptical beam layout.

Specifically, FIG. 6 is a schematic block diagram illustrating one embodiment of an elliptical beam layout 600. The elliptical beam layout 600 includes a center 602, a first focus 604 ($F_1$), a second focus 606 ($F_2$), a linear eccentricity 608, a vertex 610, a co-vertex 612, a semi-major axis 614, and a semi-minor axis 616.

In certain embodiments, footprint size information may include a hypothetical radius as a function of the semi-minor axis 616 and the semi-major axis 614 of the ellipse. In some embodiments, values of the semi-minor axis 616 and the semi-major axis 614 may be included in footprint size information sent to a LMF.

In various embodiments, one, all, or a combination of information of a first focal point (e.g., focus), a second focal point (e.g., focus), a semi-minor axis, a semi-major axis, a location of a center, a location of vertex, a location of a covertex, and the like may be sent by a NTN to a LMF.

In certain embodiments, any, some, or all the above parameters may be associated with a movement trajectory (e.g., as a function of time). For example, for an earth-moving cell and/or beam, a location of a center, a first focus, a second focus, and the like may move as a satellite moves relative to the ground (the information of which may be communicated to an LMF).

In some embodiments, any, some, or all parameters described herein may be associated with an uncertainty value.

In various embodiments, a beam footprint size may be determined or indicated by a network or a UE based on a signal strength from an NT-TRP such as a satellite access node. An example of a signal strength parameter may be a reference signal receive power ("RSRP") associated with a reference signal ("RS") transmitted through the said beam. In one realization, a beam footprint size may be determined or indicated as a radius or diameter in which the RSRP associated with an RS as measured on the ground is within a ratio, such as 3 dB, with respect to a peak (e.g., maximum) of the RSRP as measured on the ground. If the ratio is 3 dB, the beam-width may be called a half-power beam-width ("HPBW").

In certain embodiments, a radius or diameter (or an equivalent measure of footprint size for elliptical or other noncircular footprint shapes) may be measured by other UEs or may be hypothetical according to a standard specification of configuration, which may be a function of a number of phased antenna elements on the satellite, an aperture of an antenna on the satellite, and the like. The size and shape of a beam and/or cell footprint obtained according to an actual or hypothetical signal strength may depend on satellite coordinates and trajectory with respect to a center of a beam and/or cell.

FIG. 7 is a diagram illustrating one embodiment of a NG-RAN access point position IE 700.

In some embodiments, as an example of an NG-RAN access point position IE for an NT-TRP, such as a satellite access node position, parameters may include a latitude sign, a latitude, a longitude, a direction of altitude, an altitude, as well as orientation and uncertainty parameters may be configured as a function of time.

In various embodiments, a configuration may be provided for a certain point in time (T0). A satellite access node's ephemeris such as location and velocity coordinates as a function of time, nominal, and/or actual orbit information, and the like may be provided to an LMF. Then, the LMF may compute parameters as a function of time based on values of the parameters for the time T0 and ephemeris information provided as a function of time.

In certain embodiments, each parameter as a function of time may be realized as a polynomial function or other parameterized functions. In some embodiments, a parameter may be tabulated for certain times. Then, an LMF may employ interpolation and/or extrapolation to obtain values for the parameter for time instances that are not indicated in a table. In various embodiments, instead of performing extrapolation, new values for a parameter may be signaled to an LMF In some embodiments, each parameter as a function of time may be associated with a validity timer. Each time a new value or a table of values is received for a parameter, an associated validity timer may be reset. If a validity timer expires, the associated parameter may be considered obsolete in which case an error occurs. An LMF may send an error message or otherwise handle an error by implementation (e.g., by performing extrapolation on expired values for the parameter).

In various embodiments, in addition to a solicited beam ID request by an LMF, a target-UE may provide and/or report available radio resource management ("RRM") measurements in an unsolicited manner to the LMF (e.g., SS-RSRP, CSI-RSRP, or the like). In addition to a received power, received signal metrics may include reference signal received quality ("RSRQ") and/or received signal strength indicator ("RSSI") metrics. A target-UE may associate reported measurements RRM with a timestamp, validity timer, expiration timer, or the like. RRM measurements may be obtained during initial access procedures or via cell reselection methods.

In certain embodiments, an LMF may initiate an LTE positioning protocol ("LPP") request and/or provide location information signaling via LPP for invocation of E-BID and/or E-CID positioning to a UE and/or group of UEs together with a required response time. A request from an LMF may include a desired E-BID and/or E-CID measurement type, where an LMF may require SSB ID and/or beam ID information in addition to other predetermined information for an E-CID method. The LMF may need further information, such as geographical coordinates corresponding to beam IDs, SSB IDs, and/or cell IDs and satellite position at that time instance to estimate a UE position. This may be requested during information transfer from a gNB to an LMF.

In some embodiments, a target-UE may report RRM measurements to a serving base station and an LMF may send request and response signaling via an NRPPa interface for desired RRM measurements.

In various embodiments, multiple measurements with different time periods may be requested using a single LPP message. In such embodiments, the LPP request location information message includes a time interval and/or periodicity for requested measurements. In certain embodiments, a UE sends an LPP provide location information message separately for each measurement. In some embodiments, all measurements are sent in one message, where a time stamp for each measurement is included. In various embodiments, with an NTN and TN mixed gNB architecture, TN transmission and reception point ("TRP") IDs may be used in conjunction with NTN beam IDs to improve accuracy and reduce uncertainty of an enhanced NTN beam ID procedure.

In certain embodiments, configuration IEs for E-CID may be used to configure an E-BID and/or E-CID method by incorporating additional relevant parameters. In some embodiments, new configuration IEs are specified for E-BID for information transfer.

In various embodiments, parameters in an NG-RAN access point position IE may be provided as a function of time, in tabulated form, and the like. This may be due to possible mobility of an NT-TRP, such as a satellite access node in a LEO satellite system. FIG. 8 is a diagram illustrating one embodiment of an E-CID measurement result IE 800.

In certain embodiments, an nG-RANAccessPointPosition parameter in the E-CID measurement result IE is a modified version. In some embodiment, an nG-RANAccessPointPosition parameter in the E-CID measurement result IE includes an additional parameter indicating an association with another signaling, wherein the signaling may provide to an LMF updated ephemeris information associated with a satellite access node or other NT-TRP.

In various embodiments, the E-CID measurement result IE may include a new parameter that indicates that a measurement result message may include any, some, or all the following: 1) a time stamp associated with the measurement result; 2) one or more current values for one or more parameters in an NG-RAN access point position (e.g., latitude, longitude, altitude, and so forth); and/or 3) one or more current estimates or approximate values for one or more parameters in the NG-RAN access point position, which may be computed as one or more indicated functions of time, one or more tables of values, interpolation, extrapolation, interpolation if a validity timer is not expired, extrapolation if a validity timer is not expired, extrapolation if a validity timer is expired, and the like.

FIG. 9 is a diagram illustrating another embodiment of an E-CID measurement result IE 900. In certain embodiments, geographical coordinates IE may be modified for NTN positioning.

In various embodiments, any, some, or all a set of parameters may be provided as a function of time and/or in tabulated form for certain time instances. For tabulation, values for other time instances may be computed by interpolation or extrapolation, wherein the interpolation or extrapolation may be conditioned on an associated validity timer for each parameter. The set of parameters may include: 1) accuracy; 2) tRPPosition; 3) tRPHAposition; 4) referencePoint; 5) tRPPositionRelativeGeodetic; and/or 6) tRPPositionRelativeCartesian.

Figure 10:
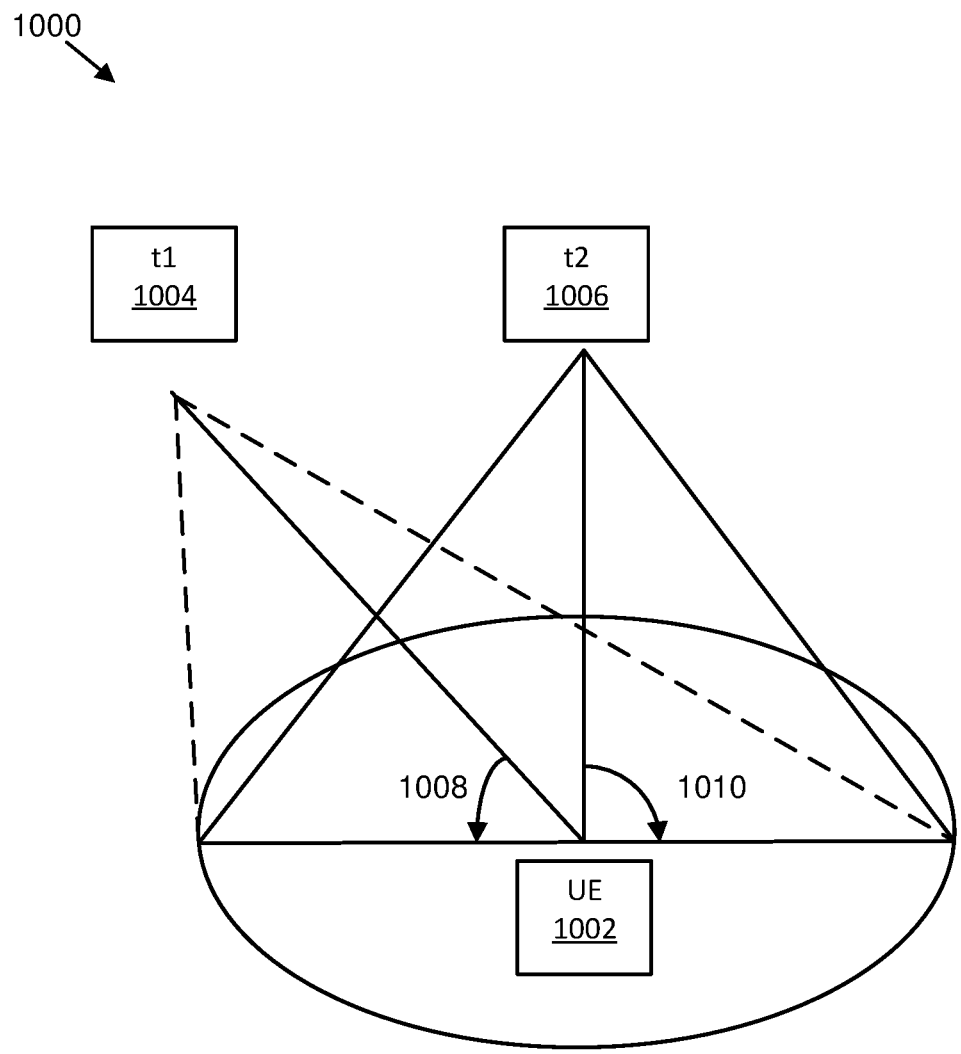
FIG. 10 is a schematic block diagram illustrating one embodiment of a system with satellite positions and elevation levels.

In a second embodiment, there may be E-BID and/or E-CID accuracy enhancement using signal strength and/or elevation angle mapping. In the second embodiment, a cell and/or beams are partitioned according to signal strength values (e.g., layer 1 ("L1") RSRP ("L1-RSRP"), L1 signal to interference and noise ratio ("SINR") ("L1-SINR"), RSRQ, RSSI) that may be specific to a satellite position. The signal strength values may be associated with RS measurements including SSB, CSI-RS, phase tracking ("PT") RS ("PT-RS"), demodulation reference signal ("DM-RS"), PRS, or the like. The signal strength values (e.g., L1-RSRP, L1-SINR, RSRQ, RSSI) change with satellite movement because a UE will experience different elevation angles, thus different path gains. For instance, for an earth fixed cell and/or beams, the elevation angle is minimum for UEs that are far from the satellite and the satellite is low at the horizon. The maximum elevation angle may occur if the satellite is right above the cell and/or beams. An illustration of this is depicted in FIG. 10. This may be true for earth moving cells, where the elevation angle changes with respect to a UE as beams and/or cells moves. Using a mapping of signal strength values (e.g., L1-RSRP, L1-SINR, RSRQ, RSSI) and elevation angle (e.g., dependent on satellite movement), an approximate position of a UE in a cell and/or beam may be estimated, thus enhancing accuracy of an E-BID and/or an E-CID positioning method. Table 1 is one example of a mapping table. The mapping information may be exchanged during information transfer between LMF and gNB. In one implementation, mapping of elevation and RS signal strength may be based on historic data that may be stored in a gNB and transferred to an LMF on request or stored directly in the LMF.

TABLE 1

Mapping of beam elevation angle, RS signal strength, and time stamp

| | Beam ID | Beam Elevation | RS Signal Strength | Time Stamp |
|---|---|---|---|---|
| NTN Cell ID | 1 | α1 | RS1 | t1 |
| | 2 | α2 | RS2 | t2 |
| | . | . | . | . |
| | . | . | . | . |
| | . | . | . | . |
| | N | αm | RSp | tq |

In certain embodiments, based on a single time instance reported signal strength value (e.g., L1-RSRP, L1-SINR, RSRQ, RSSI) and using satellite position information, an approximate position within a beam and/or cell may be estimated. For instance, UEs relatively near to a satellite position may have better L1-RSRP values as compared to the UEs that are far away from the satellite position. For instance, this information may be exchanged between an LMF and a UE by LPP message exchange, where the UE provides signal strength with a time stamp corresponding to a beam ID. The LMF may know the satellite position corresponding to a time frame with the help of initial information exchange between the LMF and a gNB.

FIG. 10 is a schematic block diagram illustrating one embodiment of a system 1000 with satellite positions and elevation levels. The system 1000 includes a UE 1002, a first satellite 1004 at time t1, and a second satellite 1006 at time t2. The first satellite 1004 and the second satellite 1006 may be the same satellite at different points in time. The first satellite 1004 has a first elevation angle 1008 relative to the UE 1002, and the second satellite 1006 has a second elevation angle 1010 relative to the UE 1002. The second elevation angle 1010 may be a maximum elevation angle because the second satellite 1006 is right above the UE 1002.

In some embodiments, a UE is configured to report L1-RSRP values at multiple time instances for different satellite positions. Using multiple measurements may increase positioning estimation accuracy within a beam and/or cell. This may be configured using an LPP message or using an NRPPa message. In one implementation, if LPP message request location information is used, a time period may be indicated, and a UE may be expected to report all measurements within that time period with each measurement having a time stamp. In another implementation, a UE averages a number of RS measurements and sends only one measurement report. This may be helpful if a time granularity of measurement is very short and there is a need to avoid large delays because of larger round trip time ("RTT") in NTN. In yet another implementation, if an NRPPa E-BID and/or E-CID measurement initiation request message is transmitted to an NG-RAN node, this request may include an indication of multiple E-BID and/or E-CID measurements requested.

In a third embodiment, there may be E-BID accuracy enhancement using measurements on multiple beams. In such an embodiment, positioning accuracy may be increased if knowledge of a UE position relative to another beam ID is known. According to the third embodiment, the UE is requested to report signal strength value (e.g., L1-RSRP, L1-SINR, RSRQ, RSSI) on multiple beams. Based on the reported signal value level (e.g., L1-RSRP, L1-SINR, RSRQ, RSSI) for multiple beams, an accuracy of the UE location may be increased. In NTN, specifically in the case of LEO satellites, adjacent beams have relatively big overlapping areas (e.g., up to 10 kilometers or more) which highly depends on antenna size and an altitude of a satellite. Since a satellite ephemeris and beam deployment type (e.g., earth moving or earth fixed) are known to a network, a size of an overlapping area of two or more beams may be established by a system for a certain configuration (e.g., satellite altitude, beamforming weights, and so forth).

Figure 11:
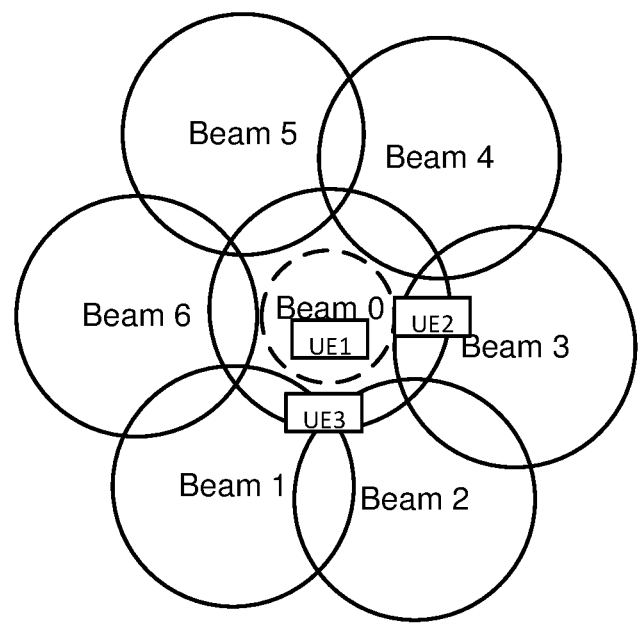
FIG. 11 is a schematic block diagram illustrating a system for an E-BID/E-CID positioning methodology based on multiple beam L1-RSRP reporting.

FIG. 11 is a schematic block diagram illustrating a system 1100 for an E-BID positioning methodology based on multiple beam L1-RSRP reporting. FIG. 11 shows an illustration of such a positioning accuracy enhancement. If a UE is in a center of a beam or away from overlapping areas of adjacent beams, it may have a high L1-RSRP level (e.g., it may be any signal strength value, e.g., L1-SINR, RSRQ, RSSI) for one beam and negligible or no RSRP levels for other beams (e.g., only noise). In such a case, a positioning accuracy is reduced to areas where there is no beam overlapping, as it is shown in FIG. 11 for UE1 (e.g., positioning accuracy corresponds to the dotted circle). If the UE reports two L1-RSRP levels corresponding to two beams (e.g., both levels are higher than the defined noise threshold), the UE may be in an overlapping area of two beams or near to it. This may reduce a positioning accuracy to an intersection area of two beams. In this case, the L1-RSRP values may indicate an approximated position of the UE in the overlapping areas (e.g., if the measurement indicates the similar L1-RSRP level of two beams). The UE may be in the center, as shown in FIG. 11 for UE2. In a last scenario, a UE may have high L1-RSRP levels for three beams (e.g., UE3), thus further increasing the accuracy of UE location. The relative L1-RSRP levels may be used to accurately point out the UE location. Subject to a UE capability, the network may configure N maximum beams corresponding to each NTN Mth cell to be measured.

In some embodiments, an LMF sends an NRPPa request message to a NG-RAN node (e.g., gNB, gateway, or satellite) to perform measurements on one or more beams associated with a cell ID. The NG-RAN node assigns corresponding RS resources for measurements, for instance CSI-RS, for all beams where such measurements may be performed on multiple bandwidth parts ("BWPs") or polarizations associated with beam IDs. In one implementation, the NG-RAN node only configures resources for beams that are neighboring to a current beam ID. In another implementation, the NG-RAN node configures resources for all beams in a cell. In yet another implementation, an LMF sends an NRPPa request message to perform measurements on multiple beams associated with different cell ID. Once the NG-RAN node has the requested measurements results (e.g., RS signal strengths for multiple beams), the NG-RAN node sends an NRPPa E-BID and/or E-CID measurement initiation response message that contains the RSRP levels for one or more beam IDs. In one implementation, a time stamp is associated with results.

In a fourth embodiment, there may be E-BID and/or E-CID accuracy enhancement using satellite movement information. According to the fourth embodiment, movement of a satellite is mapped to increase an accuracy of E-BID and/or E-CID positioning specifically for earth moving cells. In such an embodiment, a UE is configured to report signal strength values (e.g., L1-RSRP, L1-SINR, RSRQ, RSSI) with a certain time granularity. For example, an LMF may configure such a time granularity via LPP, or if the LMF is co-located with an NTN gNB or gateway, the signaling may be performed via RRC. For example, a granularity may be based on a satellite altitude, beam footprint size, or satellite movement. With the movement of satellite and cell, for instance, L1-RSRP values change over time as a new beam approaches a UE. The distance that satellite has moved from a first time instance to a time where the UE switches to another beam may be mapped based on beam movement (e.g., how much the beam has moved relative to earth); thus indicating a distance the UE is located from a beam edge.

Figure 12A:
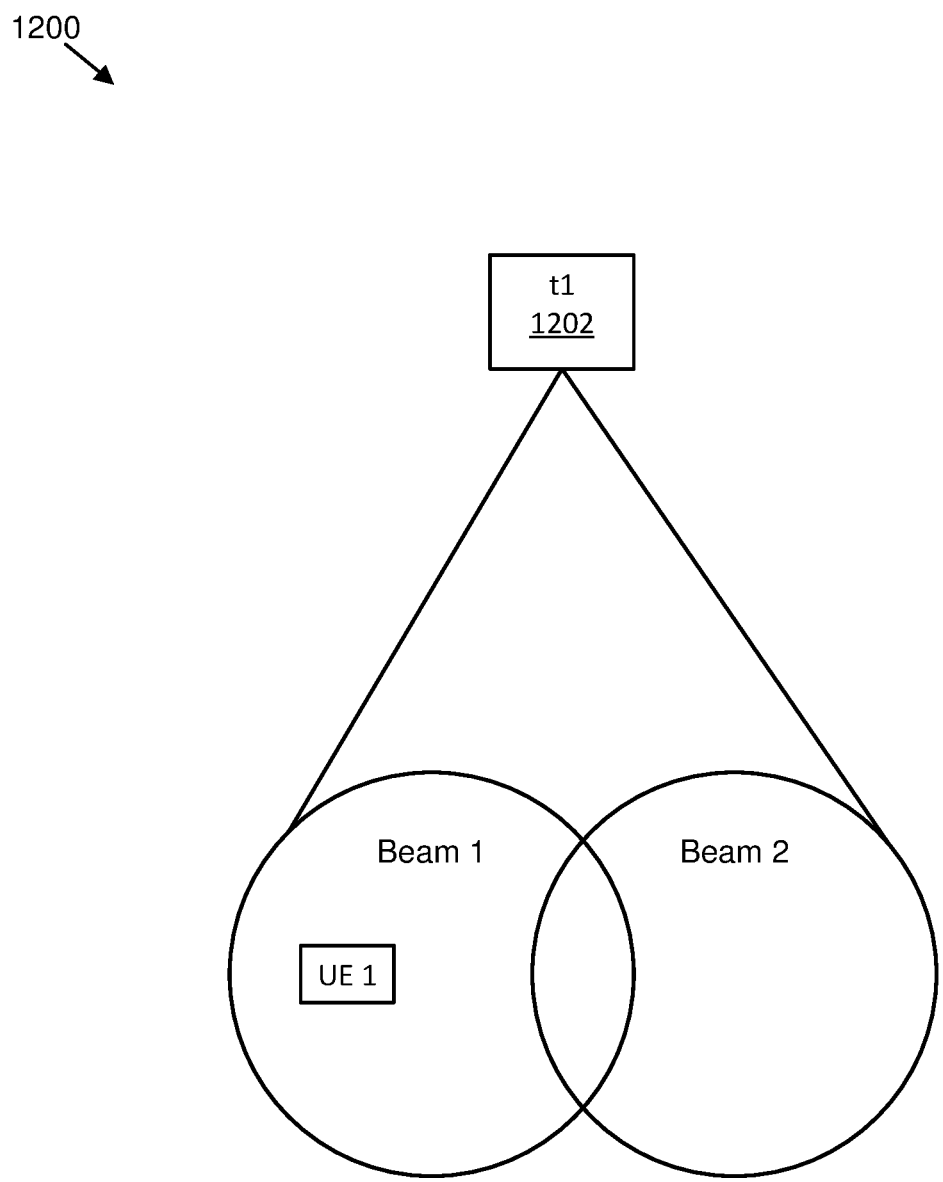
FIGS. 12A and 12B are schematic block diagrams illustrating one embodiment of a system showing illustration of distance calculation based on satellite movement for earth moving cells.
Figure 12B:
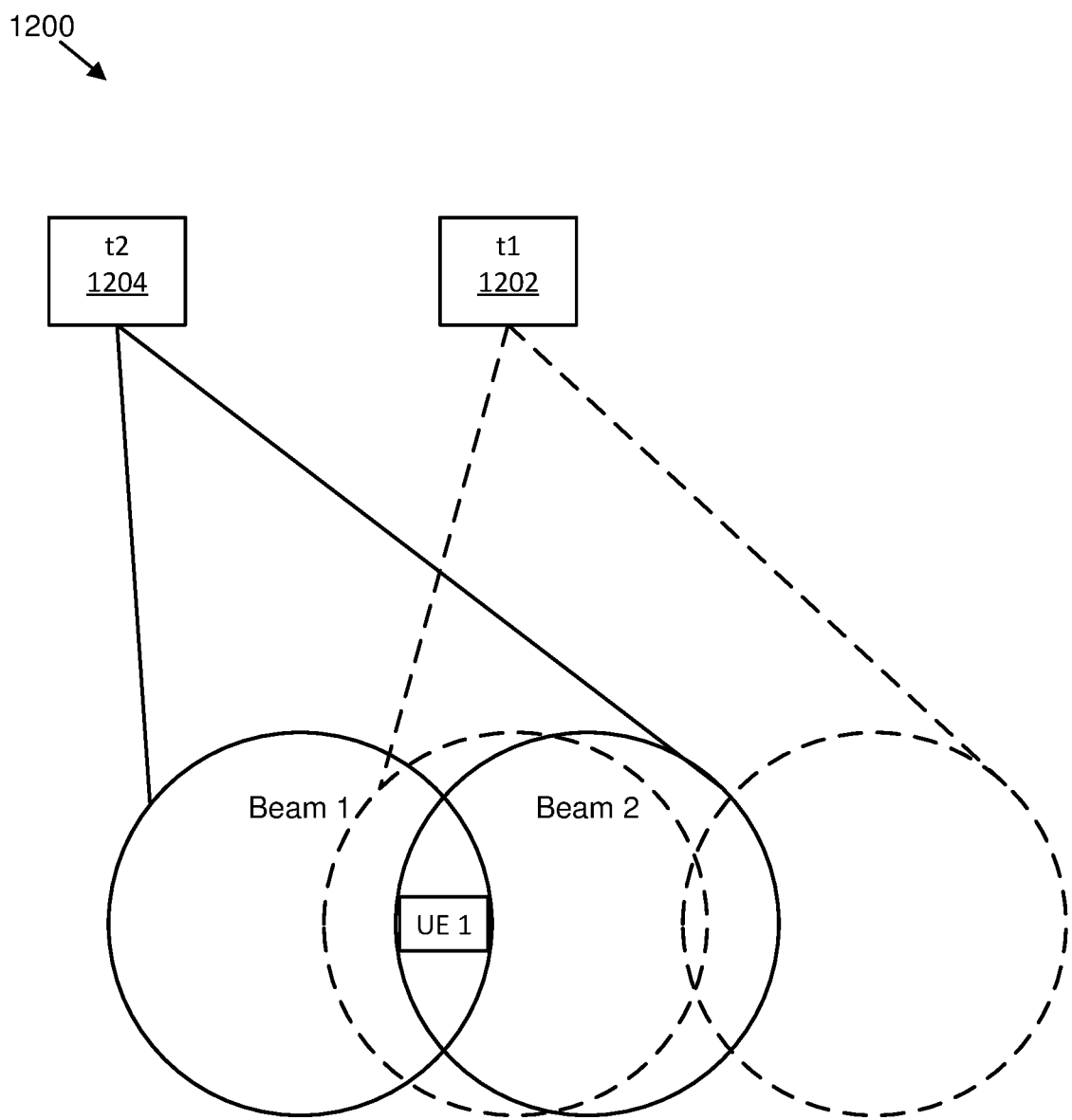

FIGS. 12A and 12B are schematic block diagrams illustrating one embodiment of a system 1200 showing illustration of distance calculation based on satellite movement for earth moving cells. The system 1200 includes a first satellite 1202 at time t1, and a second satellite 1204 at time t2. The second satellite 1204 may be a second position of the first satellite 1202. In FIG. 12A, a UE 1 is located in beam 1. The UE 1 measures an L1-RSRP value and reports the measured value to the first satellite 1202 at the time t1. At this point, L1-RSRP of beam 1 has a high value while for beam 2, L1-RSRP corresponds to noise. As the cell moves as illustrated in FIG. 12B, the UE 1 measures L1-RSRP at the time t2 (e.g., according to configured measurement granularity). At this point, the UE 1 is in the intersection area of two beams due to cell movement, so will experience good L1-RSRP values for both beams. The network calculates a distance that the satellite has traveled from times t1 to t2 and calculates how much the cell has travelled from t1 to t2 based on satellite distance mapping. Once this distance is known, the network may calculate how far away the UE is from a cell edge, thus increasing accuracy of positioning.

In various embodiments, a target-UE may apply doppler compensation, timing drift compensation, and/or averaging to reduce ambiguity of RSRP measurements at different time instance (e.g., t1, t2, and so forth).

Figure 13A:
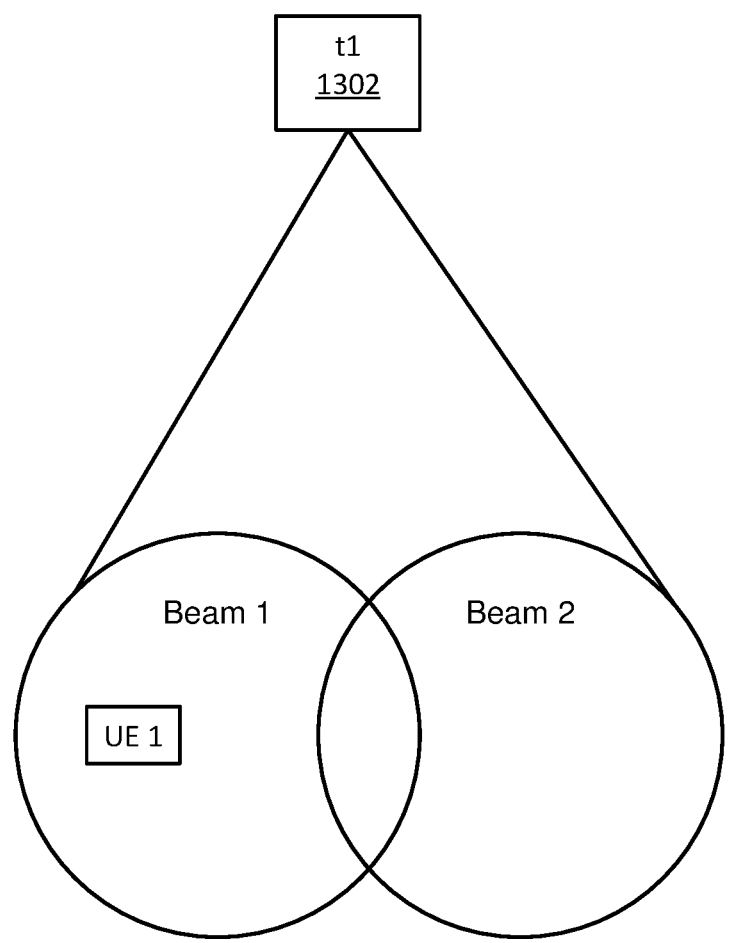
FIGS. 13A and 13B are schematic block diagrams illustrating another embodiment of a system showing illustration of distance calculation based on satellite movement for earth moving cells.
Figure 13B:
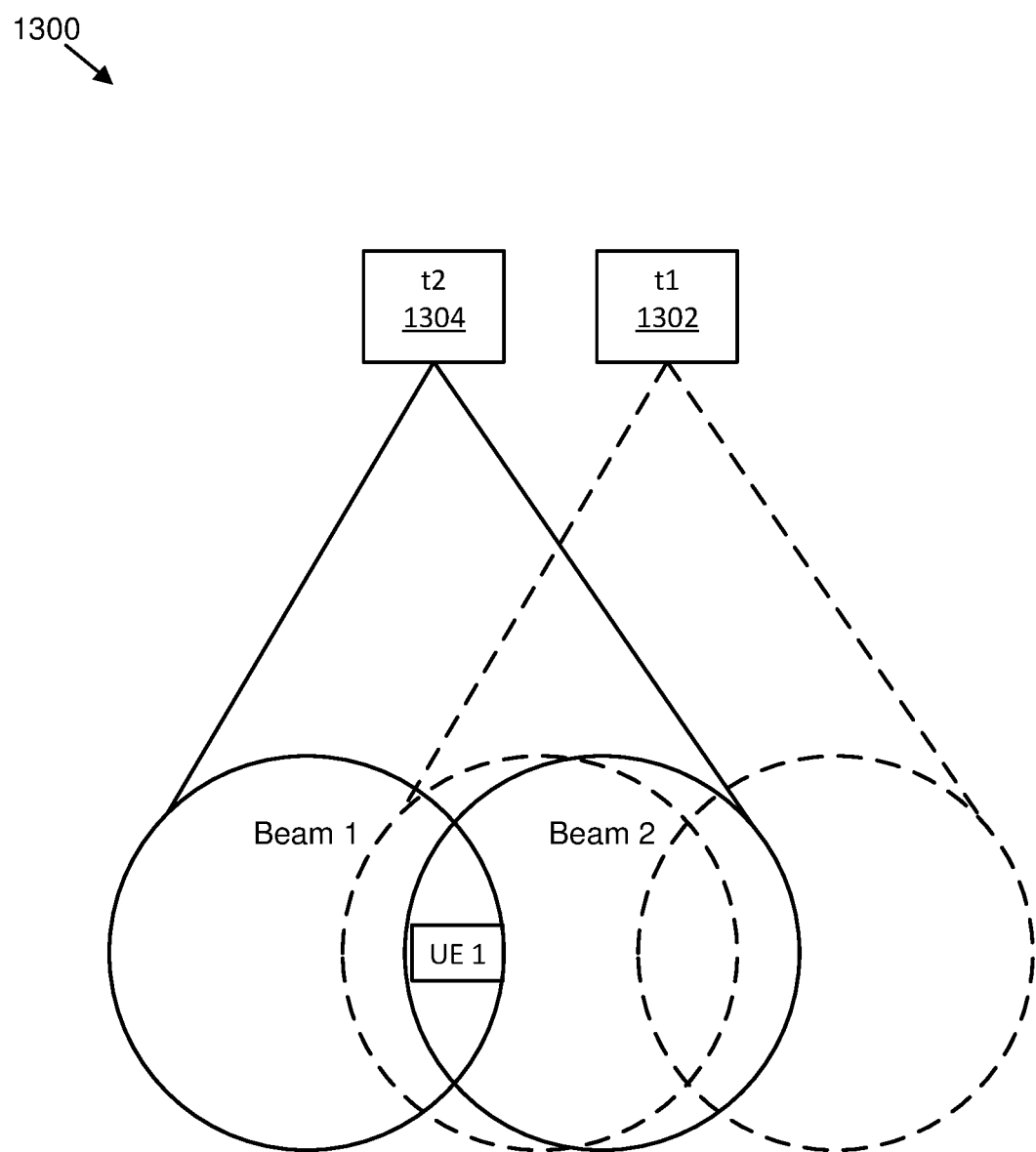

FIGS. 13A and 13B are schematic block diagrams illustrating another embodiment of a system 1300 showing illustration of distance calculation based on satellite movement for earth moving cells. The system 1300 includes a first satellite 1302 at time t1, and a second satellite 1304 at time t2. The second satellite 1304 may be a second position of the first satellite 1302. In one embodiment, an accuracy of E-BID and/or E-CID is increased by calculating a pointing angle with respect to movement of a single satellite. This may be achieved by calculating a distance of a UE from a satellite (e.g., based on signal strength value i.e., L1-RSRP, L1-SINR, RSRQ, RSSI) for two satellite positions (e.g., at two-time intervals such as at times t1 and t2). A distance from a satellite first position to a second position (e.g., from t1 to t2 in FIG. 13B) may be known, as it is dependent on a satellite ephemeris.

Figure 14:
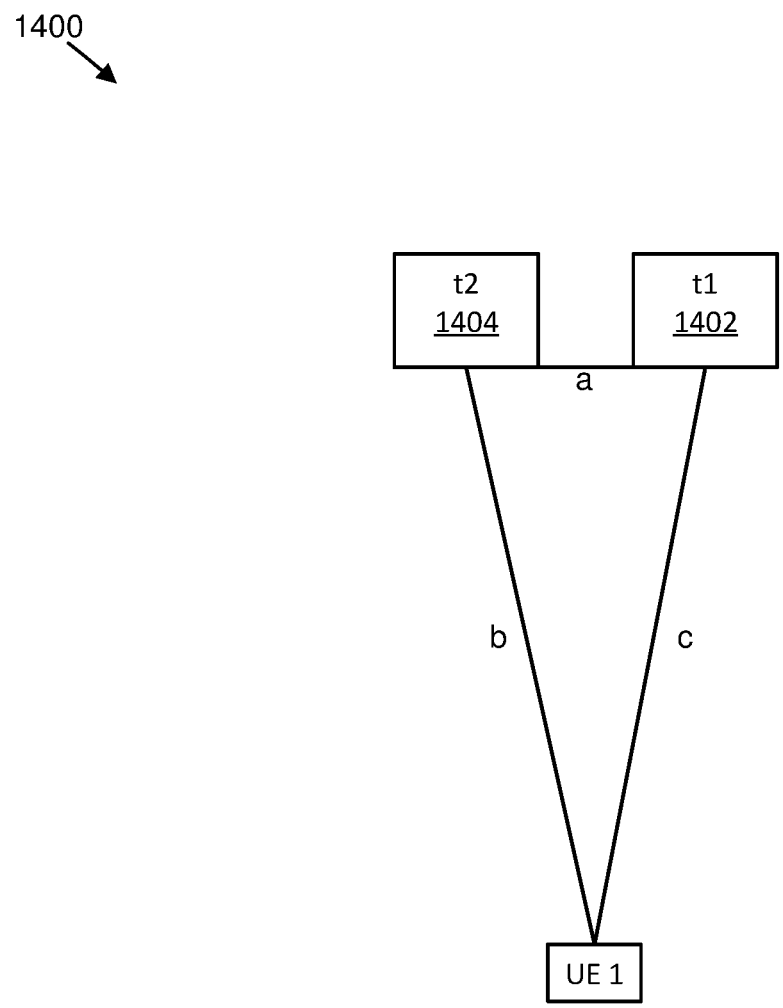
FIG. 14 is a schematic block diagram illustrating one embodiment of a system showing calculation of distances.

FIG. 14 is a schematic block diagram illustrating one embodiment of a system 1400 showing calculation of distances. The system 1400 includes a first satellite 1402 at time t1, and a second satellite 1404 at time t2. The second satellite 1404 may be a second position of the first satellite 1402. Distances a, b, and c depict approximate distances of three sides of a triangle. An approximate pointing angle specific to a UE in a beam and/or cell may be calculated by using trigonometric laws (e.g., law of cosines). It should be noted that a calculation and/or formulation may be valid for both earth moving and earth fixed cells.

Figure 15:
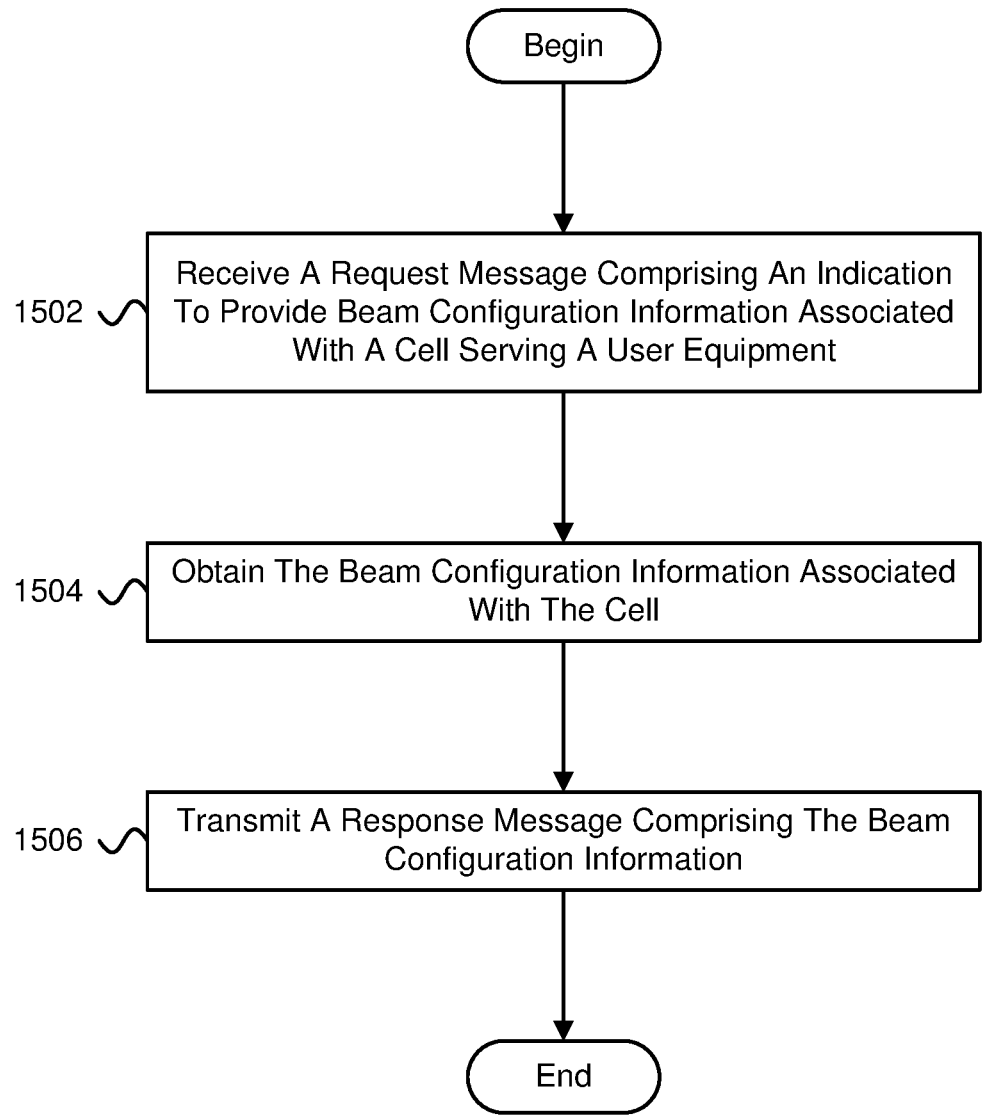
FIG. 15 is a flow chart diagram illustrating one embodiment of a method for configuring information for location determination.

FIG. 15 is a flow chart diagram illustrating one embodiment of a method 1500 for configuring information for location determination. In some embodiments, the method 1500 is performed by an apparatus, such as the network unit 104 and/or one or more functions of the mobile core network 140. In certain embodiments, the method 1500 may be performed by a processor executing program code, for example, a microcontroller, a microprocessor, a CPU, a GPU, an auxiliary processing unit, a FPGA, or the like.

In various embodiments, the method 1500 includes receiving 1502, at a non-terrestrial station, a request message including an indication to provide beam configuration information associated with a cell serving a user equipment. In some embodiments, the method 1500 includes obtaining 1504 the beam configuration information associated with the cell. In certain embodiments, the method 1500 includes transmitting 1506 a response message including the beam configuration information.

In certain embodiments, the beam configuration information comprises a number of beams in the cell. In some embodiments, the beam configuration information comprises beam coverage area coordinates associated with at least one beam in the cell. In various embodiments, the beam coverage area coordinates comprise: a center coordinate and a radius value associated with the at least one beam; a first focus, a second focus, and a vertex, a covertex, or a combination thereof associated with the at least one beam; or a combination thereof.

In one embodiment, obtaining the beam configuration information comprises computing the beam coverage area coordinates based on a latitude of the non-terrestrial station, a longitude of the non-terrestrial station, an altitude of the non-terrestrial station, a beam angle associated with the at least one beam, a beam width associated with the at least one beam, a parameter indicating whether the at least one beam is of an earth-fixed type or an earth-moving type, or some combination thereof. In certain embodiments, the beam configuration information comprises an altitude and a velocity associated with the non-terrestrial station. In some embodiments, the beam configuration information comprises a time duration associated with a coverage of the at least one beam.

In various embodiments, obtaining the beam configuration information comprises computing the time duration based on a velocity of the non-terrestrial station, a beam angle and a beam-width associated with the at least one beam, a signal strength variation as a function of a non-terrestrial station movement associated with the at least one beam, a parameter indicating whether the at least one beam is of an earth-fixed type or an earth-moving type, or some combination thereof.

In one embodiment, the method 1500 further comprises obtaining the signal strength variation as a function of the non-terrestrial station movement based on a plurality of signal strength reports from a plurality of user equipments. In certain embodiments, the method 1500 further comprises obtaining the signal strength variation as a function of the non-terrestrial station movement based on a plurality of beam dwelling times associated with a plurality of user equipments.

In some embodiments: the request message further comprises a second indication, wherein the second indication indicates whether to include, in the response message, a signal strength associated with a serving beam; and the response message comprises a value of the signal strengths associated with the beam. In various embodiments: the request message further comprises a third indication, wherein the third indication indicates whether to include, in the response message, a plurality of signal strengths associated with a plurality of neighboring beams; and the response message comprises the plurality of signal strengths associated with the plurality of neighboring beams.

In one embodiment, the non-terrestrial station determines the plurality of neighboring beams with respect to the serving beam. In certain embodiments, the response message further comprises a timestamp associated with the plurality of signal strengths. In some embodiments, the response message further comprises a timestamp associated with the signal strength.

Figure 16:
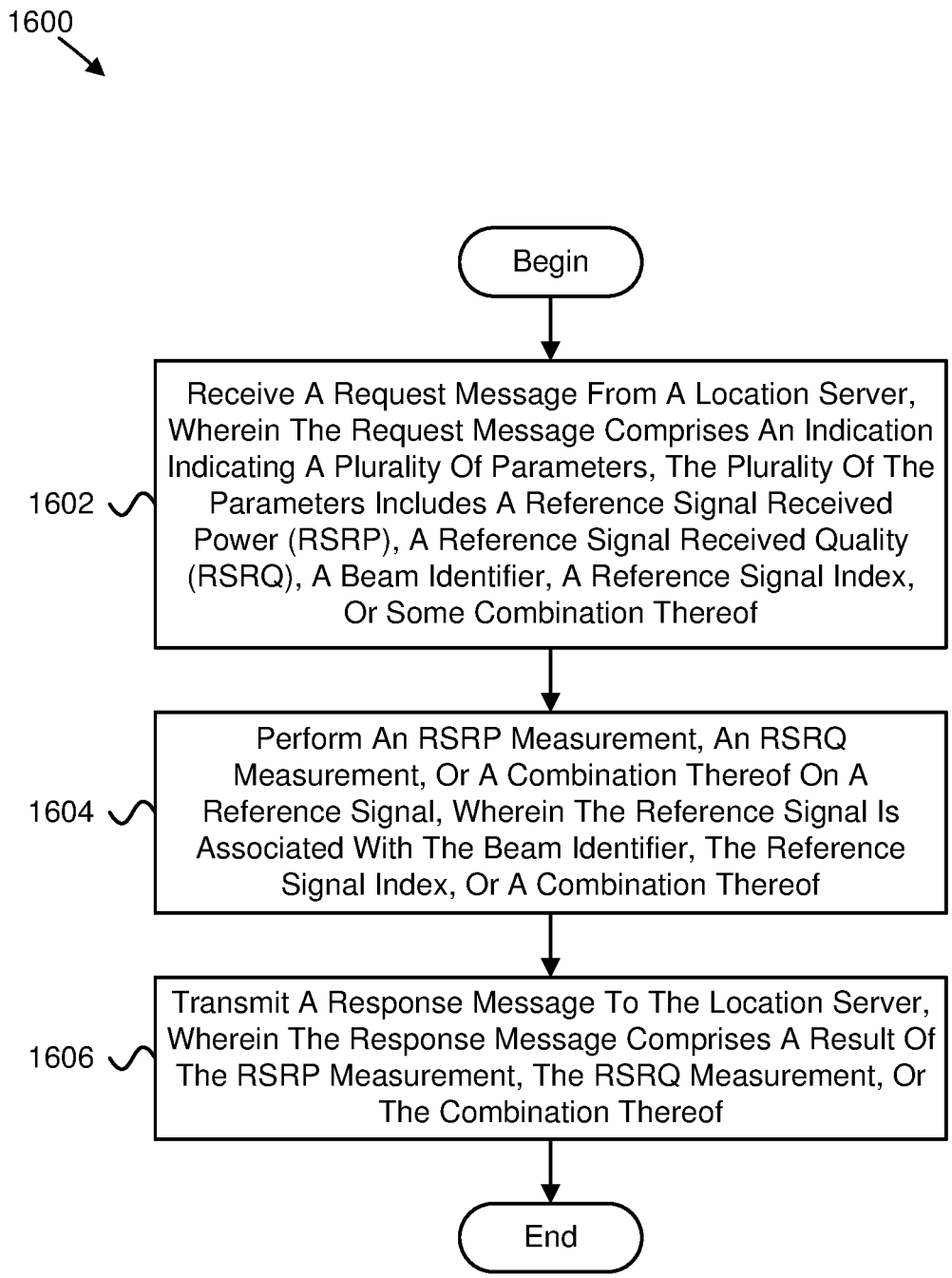
FIG. 16 is a flow chart diagram illustrating another embodiment of a method for configuring information for location determination.

FIG. 16 is a flow chart diagram illustrating another embodiment of a method 1600 for configuring information for location determination. In some embodiments, the method 1600 is performed by an apparatus, such as the remote unit 102. In certain embodiments, the method 1600 may be performed by a processor executing program code, for example, a microcontroller, a microprocessor, a CPU, a GPU, an auxiliary processing unit, a FPGA, or the like.

In various embodiments, the method 1600 includes receiving 1602, at a user equipment, a request message from a location server. The request message includes an indication indicating a plurality of parameters, and the plurality of parameters includes a reference signal received power (RSRP), a reference signal received quality (RSRQ), a beam identifier, a reference signal index, or some combination thereof. In some embodiments, the method 1600 includes performing 1604 an RSRP measurement, an RSRQ measurement, or a combination thereof on a reference signal. The reference signal is associated with the beam identifier, the reference signal index, or a combination thereof. In certain embodiments, the method 1600 includes transmitting 1606 a response message to the location server. The response message includes a result of the RSRP measurement, the RSRQ measurement, or the combination thereof.

Figure 17:
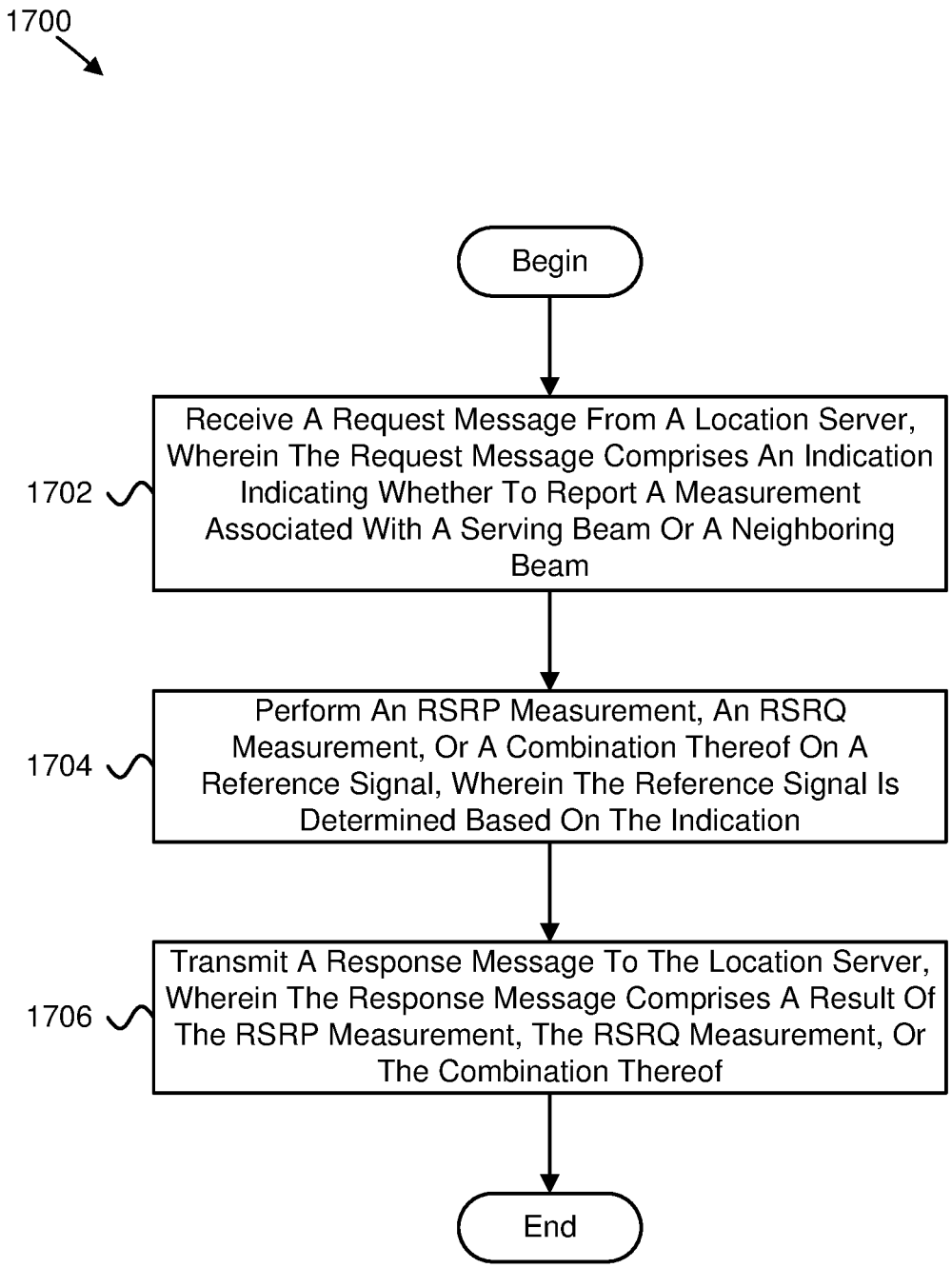
FIG. 17 is a flow chart diagram illustrating a further embodiment of a method for configuring information for location determination.

FIG. 17 is a flow chart diagram illustrating another embodiment of a method 1700 for configuring information for location determination. In some embodiments, the method 1700 is performed by an apparatus, such as the remote unit 102. In certain embodiments, the method 1700 may be performed by a processor executing program code, for example, a microcontroller, a microprocessor, a CPU, a GPU, an auxiliary processing unit, a FPGA, or the like.

In various embodiments, the method 1700 includes receiving 1702, at a user equipment, a request message from a location server. The request message includes an indication indicating whether to report a measurement associated with a serving beam or a neighboring beam. In some embodiments, the method 1700 includes performing 1704 an RSRP measurement, an RSRQ measurement, or a combination thereof on a reference signal. The reference signal is determined based on the indication. In certain embodiments, the method 1700 includes transmitting 1706 a response message to the location server. The response message includes a result of the RSRP measurement, the RSRQ measurement, or the combination thereof.

In one embodiment, a method of a non-terrestrial station comprises: receiving a request message comprising an indication to provide beam configuration information associated with a cell serving a user equipment; obtaining the beam configuration information associated with the cell; and transmitting a response message comprising the beam configuration information.

In certain embodiments, the beam configuration information comprises a number of beams in the cell.

In some embodiments, the beam configuration information comprises beam coverage area coordinates associated with at least one beam in the cell.

In various embodiments, the beam coverage area coordinates comprise: a center coordinate and a radius value associated with the at least one beam; a first focus, a second focus, and a vertex, a covertex, or a combination thereof associated with the at least one beam; or a combination thereof.

In one embodiment, obtaining the beam configuration information comprises computing the beam coverage area coordinates based on a latitude of the non-terrestrial station, a longitude of the non-terrestrial station, an altitude of the non-terrestrial station, a beam angle associated with the at least one beam, a beam width associated with the at least one beam, a parameter indicating whether the at least one beam is of an earth-fixed type or an earth-moving type, or some combination thereof.

In certain embodiments, the beam configuration information comprises an altitude and a velocity associated with the non-terrestrial station.

In some embodiments, the beam configuration information comprises a time duration associated with a coverage of the at least one beam.

In various embodiments, obtaining the beam configuration information comprises computing the time duration based on a velocity of the non-terrestrial station, a beam angle and a beam-width associated with the at least one beam, a signal strength variation as a function of a non-terrestrial station movement associated with the at least one beam, a parameter indicating whether the at least one beam is of an earth-fixed type or an earth-moving type, or some combination thereof.

In one embodiment, the method further comprises obtaining the signal strength variation as a function of the non-terrestrial station movement based on a plurality of signal strength reports from a plurality of user equipments.

In certain embodiments, the method further comprises obtaining the signal strength variation as a function of the non-terrestrial station movement based on a plurality of beam dwelling times associated with a plurality of user equipments.

In some embodiments: the request message further comprises a second indication, wherein the second indication indicates whether to include, in the response message, a signal strength associated with a serving beam; and the response message comprises a value of the signal strengths associated with the beam.

In various embodiments: the request message further comprises a third indication, wherein the third indication indicates whether to include, in the response message, a plurality of signal strengths associated with a plurality of neighboring beams; and the response message comprises the plurality of signal strengths associated with the plurality of neighboring beams.

In one embodiment, the non-terrestrial station determines the plurality of neighboring beams with respect to the serving beam.

In certain embodiments, the response message further comprises a timestamp associated with the plurality of signal strengths.

In some embodiments, the response message further comprises a timestamp associated with the signal strength.

In one embodiment, an apparatus comprises a non-terrestrial station. The apparatus further comprises: a receiver that receives a request message comprising an indication to provide beam configuration information associated with a cell serving a user equipment; a processor that obtains the beam configuration information associated with the cell; and a transmitter that transmits a response message comprising the beam configuration information.

In certain embodiments, the beam configuration information comprises a number of beams in the cell.

In some embodiments, the beam configuration information comprises beam coverage area coordinates associated with at least one beam in the cell.

In various embodiments, the beam coverage area coordinates comprise: a center coordinate and a radius value associated with the at least one beam; a first focus, a second focus, and a vertex, a covertex, or a combination thereof associated with the at least one beam; or a combination thereof.

In one embodiment, obtaining the beam configuration information comprises computing the beam coverage area coordinates based on a latitude of the non-terrestrial station, a longitude of the non-terrestrial station, an altitude of the non-terrestrial station, a beam angle associated with the at least one beam, a beam width associated with the at least one beam, a parameter indicating whether the at least one beam is of an earth-fixed type or an earth-moving type, or some combination thereof.

In certain embodiments, the beam configuration information comprises an altitude and a velocity associated with the non-terrestrial station.

In some embodiments, the beam configuration information comprises a time duration associated with a coverage of the at least one beam.

In various embodiments, the processor obtaining the beam configuration information comprises the processor computing the time duration based on a velocity of the non-terrestrial station, a beam angle and a beam-width associated with the at least one beam, a signal strength variation as a function of a non-terrestrial station movement associated with the at least one beam, a parameter indicating whether the at least one beam is of an earth-fixed type or an earth-moving type, or some combination thereof.

In one embodiment, the processor obtains the signal strength variation as a function of the non-terrestrial station movement based on a plurality of signal strength reports from a plurality of user equipments.

In certain embodiments, the processor obtains the signal strength variation as a function of the non-terrestrial station movement based on a plurality of beam dwelling times associated with a plurality of user equipments.

In some embodiments: the request message further comprises a second indication, wherein the second indication indicates whether to include, in the response message, a signal strength associated with a serving beam; and the response message comprises a value of the signal strengths associated with the beam.

In various embodiments: the request message further comprises a third indication, wherein the third indication indicates whether to include, in the response message, a plurality of signal strengths associated with a plurality of neighboring beams; and the response message comprises the plurality of signal strengths associated with the plurality of neighboring beams.

In one embodiment, the non-terrestrial station determines the plurality of neighboring beams with respect to the serving beam.

In certain embodiments, the response message further comprises a timestamp associated with the plurality of signal strengths.

In some embodiments, the response message further comprises a timestamp associated with the signal strength.

In one embodiment, a method of a user equipment comprising: receiving a request message from a location server, wherein the request message comprises an indication indicating a plurality of parameters, the plurality of the parameters includes a reference signal received power (RSRP), a reference signal received quality (RSRQ), a beam identifier, a reference signal index, or some combination thereof; performing an RSRP measurement, an RSRQ measurement, or a combination thereof on a reference signal, wherein the reference signal is associated with the beam identifier, the reference signal index, or a combination thereof; and transmitting a response message to the location server, wherein the response message comprises a result of the RSRP measurement, the RSRQ measurement, or the combination thereof.

In one embodiment, an apparatus comprises a user equipment. The apparatus further comprises: a receiver that receives a request message from a location server, wherein the request message comprises an indication indicating a plurality of parameters, the plurality of the parameters includes a reference signal received power (RSRP), a reference signal received quality (RSRQ), a beam identifier, a reference signal index, or some combination thereof a processor that performs an RSRP measurement, an RSRQ measurement, or a combination thereof on a reference signal, wherein the reference signal is associated with the beam identifier, the reference signal index, or a combination thereof; and a transmitter that transmits a response message to the location server, wherein the response message comprises a result of the RSRP measurement, the RSRQ measurement, or the combination thereof.

In one embodiment, a method of a user equipment comprises: receiving a request message from a location server, wherein the request message comprises an indication indicating whether to report a measurement associated with a serving beam or a neighboring beam; performing an RSRP measurement, an RSRQ measurement, or a combination thereof on a reference signal, wherein the reference signal is determined based on the indication; and transmitting a response message to the location server, wherein the response message comprises a result of the RSRP measurement, the RSRQ measurement, or the combination thereof.

In one embodiment, an apparatus comprises a user equipment. The apparatus further comprises: a receiver that receives a request message from a location server, wherein the request message comprises an indication indicating whether to report a measurement associated with a serving beam or a neighboring beam; a processor that performs an RSRP measurement, an RSRQ measurement, or a combination thereof on a reference signal, wherein the reference signal is determined based on the indication; and a transmitter that transmits a response message to the location server, wherein the response message comprises a result of the RSRP measurement, the RSRQ measurement, or the combination thereof.

In one embodiment, a method of a location server includes: transmitting a request comprising an indication to provide beam configuration information and associated received signal strength measurements of a target user equipment (UE); receiving a response message comprising the beam configuration information and the associated received signal strength measurements; and determining the location of the target UE based on a mapping between the beam configuration information and the associated received signal strength measurements.

In some embodiments, an apparatus comprises a location server. The apparatus further comprises: a transmitter that transmits a request comprising an indication to provide beam configuration information and associated received signal strength measurements of a target user equipment (UE); a receiver that receives a response message comprising the beam configuration information and the associated received signal strength measurements; and a processor that determines the location of the target UE based on a mapping between the beam configuration information and the associated received signal strength measurements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a location server, the method comprising:
   transmitting a request comprising an indication to provide beam configuration information and associated received signal strength measurements of a target user equipment (UE);
   receiving a response message comprising the beam configuration information and the associated received signal strength measurements; and
   determining a location of the target UE based on a mapping between the beam configuration information and the associated received signal strength measurements.

2. The method of claim 1, wherein the beam configuration information comprises a number of beams of a cell.

3. The method of claim 1, wherein the beam configuration information comprises beam coverage area coordinates associated with at least one beam of a cell.

4. The method of claim 3, wherein the beam coverage area coordinates comprise:
   a center coordinate and a radius value associated with the at least one beam;
   a first focus, a second focus, and a vertex, or a covertex, or a combination thereof associated with the at least one beam;
   or a combination thereof.

5. The method of claim 4, further comprising computing the beam coverage area coordinates based on a latitude of a non-terrestrial station, a longitude of the non-terrestrial station, an altitude of the non-terrestrial station, a beam angle associated with the at least one beam, a beam width associated with the at least one beam, a parameter indicating whether the at least one beam is of an earth-fixed type or an earth-moving type, or some combination thereof.

6. The method of claim 1, wherein the beam configuration information comprises an altitude and a velocity associated with a non-terrestrial station.

7. The method of claim 1, wherein the beam configuration information comprises a time duration associated with a coverage of at least one beam.

8. The method of claim 7, further comprising computing the time duration based on a velocity of a non-terrestrial station, a beam angle and a beam-width associated with the at least one beam, a signal strength variation as a function of a non-terrestrial station movement associated with the at least one beam, a parameter indicating whether the at least one beam is of an earth-fixed type or an earth-moving type, or some combination thereof.

9. The method of claim 8, further comprising obtaining the signal strength variation as a function of the non-terrestrial station movement based on a plurality of signal strength reports from a plurality of UEs.

10. The method of claim 8, further comprising obtaining the signal strength variation as a function of the non-terrestrial station movement based on a plurality of beam dwelling times associated with a plurality of UEs.

11. The method of claim 1, wherein:
    the request further comprises a second indication, wherein the second indication indicates whether to include, in the response message, a signal strength associated with a serving beam; and
    the response message comprises a value of the signal strength associated with the serving beam.

12. The method of claim 11, wherein:
    the request further comprises a third indication, wherein the third indication indicates whether to include, in the response message, a plurality of signal strengths associated with a plurality of neighboring beams; and
    the response message comprises the plurality of signal strengths associated with the plurality of neighboring beams.

13. The method of claim 12, wherein a non-terrestrial station determines the plurality of neighboring beams with respect to the serving beam.

14. The method of claim 12, wherein the response message further comprises a timestamp associated with the plurality of signal strengths.

15. The method of claim 11, wherein the response message further comprises a timestamp associated with the signal strength.

16. An apparatus comprising:
a processor; and
a memory coupled to the processor, the memory comprising instructions executable by the processor to cause the apparatus to:
  transmit a request comprising an indication to provide beam configuration information and associated received signal strength measurements of a target user equipment (UE);
  receive a response message comprising the beam configuration information and the associated received signal strength measurements; and
  determine a location of the target UE based on a mapping between the beam configuration information and the associated received signal strength measurements.

17. The apparatus of claim 16, wherein the beam configuration information comprises beam coverage area coordinates associated with at least one beam of a cell.

18. The apparatus of claim 17, wherein the beam coverage area coordinates comprise:

a center coordinate and a radius value associated with the at least one beam;
a first focus, a second focus, a vertex, or a covertex, or a combination thereof associated with the at least one beam;
or a combination thereof.

19. The apparatus of claim 16, wherein the processor obtains a signal strength variation as a function of a non-terrestrial station movement based on a plurality of signal strength reports from a plurality of UEs.

20. An apparatus comprising:
a processor; and
a memory coupled to the processor, the memory comprising instructions executable by the processor to cause the apparatus to:
  receive a request message from a location server comprising an indication indicating a request for beam configuration information and associated received signal strength measurements;
  perform the associated received signal strength measurements; and
  transmit a response message to the location server comprising the beam configuration information and the associated received signal strength measurements, wherein a location of the apparatus is determined based on a mapping between the beam configuration information and the associated received signal strength measurements.

* * * * *